United States Patent [19]

Zehavi et al.

[11] Patent Number: 5,691,974
[45] Date of Patent: Nov. 25, 1997

[54] METHOD AND APPARATUS FOR USING FULL SPECTRUM TRANSMITTED POWER IN A SPREAD SPECTRUM COMMUNICATION SYSTEM FOR TRACKING INDIVIDUAL RECIPIENT PHASE, TIME AND ENERGY

[75] Inventors: Ephraim Zehavi, Haifa, Israel; Stephen S. Carter, San Diego, Calif.; Klein S. Gilhousen, Bozeman, Mont.

[73] Assignee: Qualcomm Incorporated, San Diego, Calif.

[21] Appl. No.: 368,570

[22] Filed: Jan. 4, 1995

[51] Int. Cl.$^6$ .................... H04J 13/02; H04B 7/216
[52] U.S. Cl. .............. 370/203; 370/209; 370/210; 370/441; 370/479; 370/320; 370/516; 375/208; 375/326; 375/375
[58] Field of Search ...................... 375/200, 205, 375/208, 375, 316, 326, 349, 325, 339, 354, 362, 371, 260, 279, 280, 282–284, 373, 376; 370/18, 19, 20, 21, 22, 23, 100.1, 203, 208, 209, 318, 310, 315, 316, 320, 328, 329, 335, 343, 344, 350, 431, 441, 464, 479, 480

[56] References Cited

U.S. PATENT DOCUMENTS

| | | | |
|---|---|---|---|
| 4,672,629 | 6/1987 | Beier | 375/200 |
| 4,761,795 | 8/1988 | Beier | 375/200 |
| 4,807,256 | 2/1989 | Holmes et al. | 375/344 |
| 4,866,395 | 9/1989 | Hostetter | 329/319 |
| 4,888,788 | 12/1989 | Teranishi et al. | 375/100 |
| 4,901,307 | 2/1990 | Gilhousen et al. | 370/18 |
| 5,003,553 | 3/1991 | Schluge et al. | 375/200 |
| 5,016,257 | 5/1991 | Wolf et al. | 375/200 |
| 5,101,416 | 3/1992 | Fenton et al. | 375/200 |
| 5,101,417 | 3/1992 | Richley et al. | 370/18 |
| 5,101,501 | 3/1992 | Gilhousen et al. | 455/33 |
| 5,103,459 | 4/1992 | Gilhousen et al. | 375/200 |
| 5,109,390 | 4/1992 | Gilhousen et al. | 375/200 |
| 5,111,479 | 5/1992 | Akazawa | 375/200 |
| 5,131,006 | 7/1992 | Kamerman et al. | 375/200 |
| 5,166,951 | 11/1992 | Schilling | 375/200 |
| 5,228,054 | 7/1993 | Rueth et al. | 375/200 |

(List continued on next page.)

OTHER PUBLICATIONS

*Digital Communications with Space Applications*, S.W. Golomb et al., Prentice Hall, Inc. 1964, pp. 45–64.

Primary Examiner—Alpus H. Hsu
Assistant Examiner—Seema S. Rao
Attorney, Agent, or Firm—Russell B. Miller; Gregory D. Ogrod

[57] ABSTRACT

Method and apparatus for tracking the frequency and phase of signals in spread spectrum communication systems that makes more efficient use of available carrier frequency and phase information by utilizing a substantial portion or all of the energy occupying the frequency spectrum of a received carrier signal, including energy from communication signals intended for other system users. Multiple spread spectrum communication signals are input in parallel to data receivers where they are despread using preselected despreading codes at an adjustable phase angle and decoded over multiple orthogonal codes active within the communication system. Multiple decoded signals are then combined to form a single phase detection signal which is used by at least one tracking loop to track frequency and phase of the carrier signal for the received communication signals. The tracking loop generates a timing signal which is used to adjust the phase angle used during despreading. In further embodiments, the communication signals are despread using appropriate PN codes and separated into in-phase (I) and quadrature channels (Q) where data symbols are processed by fast Hadamard transformers to generate corresponding data bits. The data is formed into pairwise products between the channels and summed over multiple or all active subscriber orthogonal codes. This sum indicates a degree to which the estimated phase differs from the actual phase of received communication signals and is used to adjust the phase of application for the PN codes.

26 Claims, 10 Drawing Sheets

U.S. PATENT DOCUMENTS

| | | | |
|---|---|---|---|
| 5,228,056 | 7/1993 | Schilling | 375/200 |
| 5,237,586 | 8/1993 | Bottomley | 375/200 |
| 5,267,261 | 11/1993 | Blakeney et al. | 375/200 |
| 5,309,474 | 5/1994 | Gilhousen et al. | 375/200 |
| 5,311,176 | 5/1994 | Gurney | 341/50 |
| 5,329,546 | 7/1994 | Lee | 375/200 |
| 5,383,220 | 1/1995 | Murai | 375/200 |
| 5,414,728 | 5/1995 | Zehavi | 375/200 |
| 5,432,521 | 7/1995 | Siwiak et al. | 455/12.1 |
| 5,442,627 | 8/1995 | Viterbi et al. | 370/19 |
| 5,490,165 | 2/1996 | Blankeney, II et al. | 370/335 |
| 5,577,022 | 11/1996 | Padovani et al. | 370/335 |
| 5,602,833 | 2/1997 | Zehavi | 370/335 |

METHOD AND APPARATUS FOR USING FULL SPECTRUM TRANSMITTED POWER IN A SPREAD SPECTRUM COMMUNICATION SYSTEM FOR TRACKING INDIVIDUAL RECIPIENT PHASE, TIME AND ENERGY

BACKGROUND OF THE INVENTION

I. Field of the Invention

The present invention relates to multiple access communication systems, such as wireless data or telephone systems, and satellite repeater type spread spectrum communication systems. More particularly, the invention relates to method and apparatus for extracting and tracking the frequency and phase of a user channel in a spread spectrum communication system by using the available energy of a carrier signal for multiple channels. The invention further relates to a method of using several code division spread spectrum type communication signals intended for different subscribers in a communication system to allow individual system subscribers to extract and track the frequency and phase reference for their respective signal.

II. Description of the Related Art

A variety of multiple access communication systems have been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art. However, spread spectrum modulation techniques, such as code division multiple access (CDMA) spread spectrum techniques, provide significant advantages over the other modulation schemes, especially when providing service for a large number of communication system users. The use of CDMA techniques in a multiple access communication system is disclosed in the teachings of U.S. Pat. No. 4,901,307, which issued Feb. 13, 1990 under the title "SPREAD SPECTRUM MULTIPLE ACCESS COMMUNICATION SYSTEM USING SATELLITE OR TERRESTRIAL REPEATERS," is assigned to the assignee of the present invention, and is incorporated herein by reference.

The U.S. Pat. No. 4,901,307 discloses a multiple access communication system technique in which a large number of generally mobile or remote system users each employs a transceiver to communicate with other system users or desired signal recipients, such as through a public telephone switching network. The transceivers communicate through satellite repeaters and gateways or terrestrial base stations (also sometimes referred to as cell-sites or cells) using code division multiple access (CDMA) spread spectrum type communication signals. Such systems allow the transfer of various types of data and voice communication signals between system users, and others connected to the communication system.

Communication systems using spread spectrum type signals and modulation techniques, such as disclosed in U.S. Pat. No. 4,901,307, provide increased system user capacity over other techniques because of the manner in which the full frequency spectrum is used concurrently among system users within a region, and 'reused' many times across different regions serviced by the system. The use of CDMA results in a higher efficiency in utilizing a given frequency spectrum than achieved using other multiple access techniques. Using wide band CDMA techniques also permits problems such as multipath fading, encountered in conventional communication systems, to be more readily overcome, especially for terrestrial repeaters.

Pseudonoise (PN) code based modulation techniques used to generate the various communication system signals in wide band CDMA signal processing provide a relatively high signal gain. This allows spectrally similar communication signals to be more quickly differentiated which allows signals traversing different propagation paths to be readily distinguished from each other, provided path length differential causes relative propagation delays in excess of the PN chip period, that is, the inverse of the bandwidth. If a PN chip rate of say approximately 1 MHz is used in a CDMA communication system, the full spread spectrum processing gain, which is equal to the ratio of the spread bandwidth to system data rate, can be employed to distinguish or discriminate between signals or signal paths differing by more than one microsecond in path delay or time of arrival, which corresponds to a path length differential of approximately 1,000 feet. Typical urban environments provide differential path delays in excess of one microsecond, with some areas approaching 10–20 microseconds of delay.

The ability to discriminate between multipath signals greatly reduces the severity of multipath fading but typically does not totally eliminate it because of occasional paths with very small delay differentials. The existence of low delay paths is more especially true for satellite repeaters or directed communication links where multipath reflections from buildings and other terrestrial surfaces is greatly reduced. Therefore, it is desirable to provide some form of signal diversity as one approach to reducing the deleterious effects of fading and additional problems associated with relative user, or repeater, movement.

Generally, three types of diversity are produced or used in spread spectrum type communication systems, and they are time, frequency, and space diversity. Time diversity is obtainable using data repetition, time interleaving of data or signal components, and error coding. A form of frequency diversity is inherently provided by CDMA in which the signal energy is spread over a wide bandwidth. Therefore, frequency selective fading affects only a small part of the CDMA signal bandwidth.

Space or path diversity is obtained by providing multiple signal paths through simultaneous links with a mobile or remote user through two or more base stations or antennas, for terrestrial-based repeater systems; or two or more satellite beams or individual satellites, for space-based repeater systems. That is, in the satellite communication environment or for indoor wireless communication systems, path diversity may be obtained by deliberately transmitting or receiving using multiple antennas or transceivers. Furthermore, path diversity may be obtained by exploiting a natural multipath environment by allowing a signal arriving over different paths, each with a different propagation delay, to be received and processed separately for each path.

If two or more signal reception paths are available with sufficient delay differential, say greater than one microsecond, two or more receivers may be employed to separately receive these signals. Since these signals typically exhibit independent fading and other propagation characteristics, the signals can be separately processed by the receivers and the outputs combined with a diversity combiner to provide the final output information or data, and overcome problems otherwise existent in a single path. Therefore, a loss in performance only occurs when the signals arriving at both receivers experience fading or interference in the same manner and at the same time. In order to exploit the existence of multipath signals, it is necessary to utilize a waveform that permits path diversity combining operations to be performed.

Examples of using path diversity in multiple access communication systems are illustrated in U.S. Pat. No. 5,101,501 entitled "SOFT HANDOFF IN A CDMA CELLULAR TELEPHONE SYSTEM," issued Mar. 31, 1992, and U.S. Pat. No. 5,109,390 entitled "DIVERSITY RECEIVER IN A CDMA CELLULAR TELEPHONE SYSTEM," issued Apr. 28, 1992, both assigned to the assignee of the present invention, and incorporated herein by reference.

The CDMA techniques disclosed in U.S. Pat. No. 4,901,307 contemplate the use of coherent modulation and demodulation for both communication directions or links in user-satellite communications. In communication systems using this approach, a pilot carrier signal is used as a coherent phase reference for gateway- or satellite-to-user and base station-to-user links. The phase information obtained from tracking the pilot signal carrier is then used as a carrier phase reference for coherent demodulation of other system or user information signals. This technique allows many user signal carriers to share a common pilot signal as a phase reference, providing for a less costly and more efficient tracking mechanism. In satellite repeater systems, the return link generally does not require a pilot signal for phase reference for gateway receivers. In a terrestrial wireless or cellular environment, the severity of multipath fading and resulting phase disruption of the communication channel, precludes use of coherent demodulation techniques for the user-to-base station link, where a pilot signal is not typically used. The present invention allows the use of both noncoherent modulation and demodulation techniques as desired.

While terrestrial based repeaters and base stations have been predominantly employed, future systems will place more heavy emphasis on the use of satellite based repeaters for broader geographic coverage to reach a larger number of 'remote' users and to achieve truly 'global' communication service. However, satellite repeaters operate in a severely power limited environment. That is, there is a reasonably limited amount of power that the satellite control and communication systems can practically have access to. The limits are based on factors such as satellite size, battery or other storage mechanism characteristics, and solar cell technology, among others. It is extremely desirable to reduce the amount of power required or being used by the communication system for anything other than actual data transfer for a system user or subscriber. While several schemes have been proposed for limiting the amount of power used for communication or 'traffic' signals, one major source of power consumption is the pilot channel signal.

This results from the fact that a pilot signal is transmitted at a higher power level than typical voice or other data signals to provide it with a greater signal-to-noise ratio and interference margin. The higher power level also enables an initial acquisition search for the pilot signal to be accomplished at high speed while providing for very accurate tracking of the pilot carrier phase using a relatively wide bandwidth, and lower cost, phase tracking circuit. For example, in a system transmitting a total of fifteen simultaneous voice signals, the pilot signal might be allocated a transmit power equal to four or more of the voice signals. In the satellite repeater environment, an even higher proportional amount of power could be allocated to the pilot signal to counter Doppler and other effects, as compared to terrestrial based repeater systems. However, higher power in a pilot signal represents a loss of available power for other signals and can also represent a source of interference for other signals. In addition, servicing large regions with a relatively low number of active users may cause a pilot signal to account for an unacceptably large percent of the total power allocation in some applications.

Therefore, it is desirable to reduce the amount of power required for pilot channels or signals in maintaining adequate frequency and phase tracking. It is also desirable to provide improved frequency tracking for users or system subscribers in the presence of decreased pilot signal energy. This should apply even when the pilot energy has decreased to such a low energy level, either by design or because of propagation effects, as to be non-detectable for practical purposes. It is further desirable to make more efficient use of the energy being transferred into the various communication channels or signals within a communication system.

SUMMARY OF THE INVENTION

In view of the above and other problems found in the art relative to pilot channel signals in multiple access communication systems, one purpose of the present invention is to provide improved time and phase tracking, while allowing proper operation in the presence of a low energy pilot signal.

A second purpose of the invention is to provide a technique that allows frequency and phase synchronization using normal or weak amplitude pilot signals and that can be implemented to operate with no pilot signal, as desired for a specific communication system configuration. This provides more efficient allocation of energy resources.

One advantage of the invention is that it uses a larger percentage of the received spectrum energy for fast signal acquisition while supporting both coherent and non-coherent modulation.

A second advantage of the invention is that simultaneous demodulation of multiple CDMA channels is provided, which supports higher data transfer rates and provides the capability to allocate higher data rate channels for small groups of users.

Another advantage is that a centralized controller can be used for each beam in a satellite repeater based communication system, which allows a simple and cost effective structure, and fast allocation and sharing of traffic channels.

These and other purposes, objects, and advantages are realized in a signal reception technique for use by a subscriber in a spread spectrum communication system, in which users communicate through base stations or satellite repeaters over different channels within a given carrier frequency using orthogonally encoded signals. A subscriber receiver tracks the frequency and phase of a communication signal carrier which transfers several communication channels for multiple recipients within the communication system. A new tracking technique is employed that utilizes a substantial percentage of the energy available in the frequency spectrum of the carrier signal received from a given source, such as from a gateway through at least one satellite repeater, including energy from communication signals intended for other users.

A series of received communication signals are despread, after conversion to digital form, in a series of signal despreaders using appropriate despreading codes, such as pseudorandom noise (PN) codes, applied at an adjustable phase. Multiple despread signals are then demodulated or decoded in parallel to remove orthogonal cover codes and generate data symbol signals. Multiple decoded channels or data symbol signals are then combined in a summation element to provide a single phase detection signal for use as an input source to at least one tracking loop used to track the carrier frequency. The timing loop produces a timing signal which indicates the carrier signal frequency which is generally provided to the despreading stage to adjust the phase angle used in despreading.

In a preferred embodiment, communication signals having a common carrier frequency are received and converted to digital spread spectrum communication signals at a desired baseband frequency, having in-phase and quadrature components. The baseband signals, generally after a one-half chip delay relative to the received signal, are separated into in-phase (I) and quadrature (Q) channels each carrying substantially the full information content of a given communication signal.

These I and Q signal components are despread using predetermined in-phase and quadrature PN coding sequences for the communication system. During this despreading, the PN sequences, so called outer codes, are applied at a preselected rate with a phase value which is estimated to be in phase with incoming communication signals. This produces data symbols on the I and Q channels which are subsequently transformed from data symbols to data bits generally using a pair of fast Hadamard transformers. Each of the code transformers receives data symbols on one channel, I or Q, and provides an output of corresponding data bits. The data bits for the I and Q channels are formed into pairwise products in a multiplication element.

Each pairwise product of the active signal is then weighted relative to its average received power and accumulated in a summing element which sums them over multiple, typically all, active orthogonal codes, generally Walsh functions, corresponding to active signals using the common carrier frequency of interest. The resulting summed signal is then transferred through a narrow passband filter to reduce noise and unwanted spectral components from processing. The filtered signal provides an indication as to the accuracy of the phase estimate or of the degree to which the estimated phase of a received communication signal differs from its actual value. This information is used to adjust the phase of application for the PN code sequences, and lock onto the phase of the carrier signal. As desired, preselected phase offsets can also be applied to compensate for known affects such as Doppler shifts.

In further embodiments, accumulated data bits from I and Q channels are squared and summed together to produce a measure of the power in the communication signal being tracked. A filter function can be applied to the summation results and used to determine an appropriate setting for automatic signal gain in analog stages of corresponding receiver circuitry and to provide an indication of signal strength. The relative strength and phase of the pilot signal is also determined by only using the I channel data.

The digital baseband signals are also despread without any induced delay using predetermined in-phase and quadrature PN coding sequences for the communication system. During this despreading, data symbols are produced on a second set of I and Q channels which are connected to a second pair of fast Hadamard transformers. A selection mechanism allows the despreading to occur for 'early' and 'late' timing periods of the PN sequences, that is, for non-delayed and one-chip-period delayed PN sequences. The data symbols are again transformed into I and Q channel data bits which are subjected to a squaring operation. The resulting products are subtracted from each other in pairwise fashion, and then summed together over multiple active orthogonal codes. A filter function is applied to the summation results to remove unwanted frequency components from the processing. The resulting output signal provides an indication of the relative timing for use in sampling input signals, in decimation, and operates as a time tracking loop output.

BRIEF DESCRIPTION OF THE DRAWINGS

The features, objects, and advantages of the present invention will become more apparent from the detailed description set forth below when taken in conjunction with the drawings in which like reference characters identify like elements throughout and wherein.

DETAILED DESCRIPTION OF THE PREFERRED EMBODIMENTS

The present invention provides a new method and apparatus for tracking the frequency and phase of signals in spread spectrum multiple access communication systems. A new demodulation technique is employed that makes more efficient use of available carrier frequency and phase information by utilizing a substantial portion or all of the energy occupying the frequency spectrum of a received carrier signal, including energy from communication signals intended for other users. This energy is used to generate an error detection signal which can be used as an input for tracking loops which in turn adjust the timing used by receivers in despreading received signals. In one embodiment, the error detection signal directly adjusts the phase used in applying a despreading code to received signals within a receiver finger. This frequency tracking and signal demodulation approach provides a robust design in the presence of a very weak, or non-existent, pilot signal. This technique takes into consideration some constraints that exist in many satellite based communication system designs.

In a typical CDMA communication system, such as a wireless data or telephone system, base stations within predefined geographical regions, or cells, each use several spread spectrum modems to process communication signals for system users. Each spread spectrum modem generally employs a digital spread spectrum transmission modulator, at least one digital spread spectrum data receiver, and at least one searcher receiver. During typical operations, a modem in the base station is assigned to each remote or mobile user or subscriber unit as needed to accommodate transfer of communication signals with the assigned subscriber. If the modem employs multiple receivers, then one modem accommodates diversity processing, otherwise multiple modems may be used in combination. For communication systems employing satellite repeaters, these modems are generally placed in base stations referred to as gateways or hubs that communicate with users by transferring signals through the satellites. There may be other associated control centers that communicate with the satellites or the gateways to maintain system wide traffic control and signal synchronization.

Figure 1:
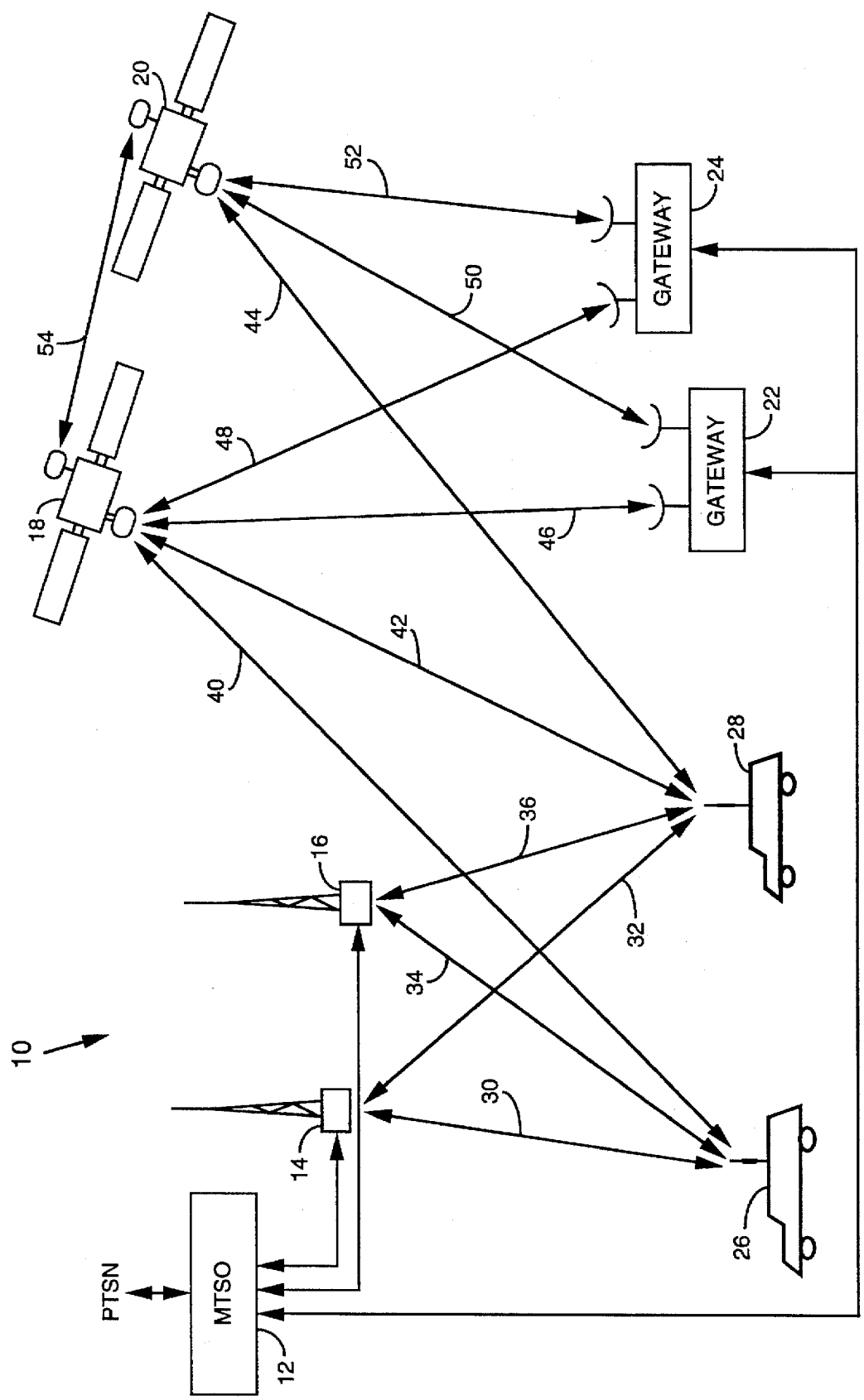
FIG. 1 illustrates a schematic overview of an exemplary CDMA wireless communication system.

An exemplary wireless communication system constructed and operating according to the principles of the present invention, is illustrated in FIG. 1. A communication system 10 illustrated in FIG. 1 utilizes spread spectrum modulation techniques in communicating between communication system remote or mobile subscriber units having wireless data terminals or telephones, and system base stations. Cellular telephone type systems in large metropolitan areas may have hundreds of base stations serving thousands of mobile system users using terrestrial based repeaters. Fewer satellite repeaters are typically used in a communication system to service more users per repeater but distributed over larger geographical regions.

As seen in FIG. 1, communication system 10 uses a system controller and switch network 12, also referred to as mobile telephone switching office (MTSO), which typically includes interface and processing circuitry for providing system-wide control for base stations or gateways. Controller 12 also controls routing of telephone calls between a public switched telephone network (PSTN) and base stations or gateways and subscriber units. The communication link that couples controller 12 to various system base stations can be established using known techniques such as, but not limited to, dedicated telephone lines, optical fiber links, or microwave or dedicated satellite communication links.

In the portion of the communication system illustrated in FIG. 1, two exemplary base stations 14 and 16 are shown for terrestrial repeater communications, along with two satellite repeaters 18 and 20, and two associated gateways or hubs 22 and 24. These elements of the system are used to effect communications with two exemplary remote subscriber units 26 and 28, which each have a wireless communication device such as, but not limited to, a cellular telephone. While these subscriber units are discussed as being mobile, it is also understood that the teachings of the invention are applicable to fixed units where remote wireless service is desired. This latter type of service is particularly relevant to using satellite repeaters to establish communication links in many remote areas of the world.

The terms beams (spots) and cells, or sectors, are used interchangeably throughout since they may be referred to in this manner in the art and the geographic regions serviced are similar in nature differing only in the physical characteristics of the type of repeater platform used and its location. Although, certain characteristics of the transmission paths and restraints on frequency and channel reuse differ between these platforms. A cell is defined by the effective 'reach' of base station signals, while a beam is a 'spot' covered by projecting satellite communication signals onto the Earth's surface. In addition, sectors generally cover different geographical regions within a cell, while satellite beams at different frequencies, sometimes referred to as FDMA signals, may cover a common geographical region.

The terms base station and gateway are also sometimes used interchangeably, with gateways being perceived in the art as specialized base stations that direct communications through satellite repeaters and have more 'housekeeping tasks,' with associated equipment, to perform to maintain such communication links through moving repeaters, while base stations use terrestrial antennas to direct communications within a surrounding geographical region. Central control centers will also typically have more functions to perform when interacting with gateways and moving satellites.

It is contemplated for this example that each of base stations 14 and 16 provide service over individual geographic regions or 'cells' serviced by transmission patterns from their respective antennas, while beams from satellites 18 and 20 are directed to cover other respective geographic regions. However, it is readily understood that the beam coverage or service areas for satellites and the antenna patterns for terrestrial repeaters may overlap completely or partially in a given region depending on the communication system design and the type of service being offered. Accordingly, at various points in the communication process handoffs may be made between base stations or gateways servicing the various regions or cells, and diversity may also be achieved between any of these communication regions or devices.

In FIG. 1, some of the possible signal paths for communication links between base station 14 and subscriber units 26 and 28 are illustrated by a series of lines 30 and 32, respectively. The arrowheads on these lines illustrate exemplary signal directions for the link, as being either a forward or a reverse link, although this serves as illustration only for purposes of clarity and does not represent any restrictions on actual signal patterns or required communication paths. In a similar manner, possible communication links between base station 16 and subscriber units 26 and 28, are illustrated by lines 34 and 36, respectively.

Additional possible signal paths are illustrated for communications being established through satellites 18 and 20. These communication links establish signal pathways between one or more gateways or centralized hubs 22 and 24, and subscriber units 26 and 28. The satellite-user portions of these communication links are illustrated by a series of lines 40, 42, and 44, and the gateway-satellite portions by lines 46, 48, 50, and 52. In some configurations it may also be possible to establish direct satellite-to-satellite communications such as over a link indicated by lines 54.

The geographic areas or cells serviced by the base stations are designed in substantially non-overlapping or non-intersecting shapes that normally place a user or subscriber unit closer to one base station than another, or within one cell sector where the cell is further sub-divided. This is also substantially the same for satellite communications, although the determinative factor here is the presence of a subscriber unit in a particular beam pattern, and its signal strength, but not relative closeness to a satellite.

As mentioned above, in current CDMA wireless or cellular telephone systems, each base station or gateway also transmits a 'pilot carrier' signal throughout its region of coverage. For satellite systems, this signal is transferred within each satellite beam, or carrier frequency, and originates with specific gateways being serviced by the satellite. A single pilot is transmitted for each gateway or base station and shared by all users of that gateway, except in the case of regions sub-divided into sectors where each sector might have its own distinct pilot signal. The pilot signal generally contains no data modulation and is used by subscriber units to obtain initial system synchronization and to provide robust time, frequency and phase tracking of the base station transmitted signals. Each gateway or base station also transmits spread spectrum modulated information, such as gateway identification, system timing, user paging information, or various other signals.

While each base-station or gateway has a unique pilot signal (subject to system wide re-use), they are not generated using different PN code generators, but use the same spreading code at different code phase offsets. This allows PN codes that can be readily distinguished from each other, in turn distinguishing originating base stations and gateways, or cells and beams. In the alternative, a series of PN codes are used within the communication system with different PN codes being used for each gateway, and possibly for each satellite plane through which gateways communicate. It will be readily apparent to those skilled in the art that as many or as few PN code as desired can, be assigned to identify specific signal sources or repeaters in the communication system. That is, codes can be employed to differentiate each repeater or signal originator within the system as desired, subject to the total number of possible communication channels and a desired to maximize the number of users addressable within the system.

Using one pilot signal code sequence throughout a communication system allows subscriber units to find system timing synchronization with a single search over all pilot signal code phases. The strongest pilot signal is readily detectable using a correlation process for each code phase. A subscriber unit sequentially searches the whole sequence and tunes to the offset or shift that produces the strongest correlation. The strongest pilot signal identified by this process generally corresponds to the pilot signal transmitted by the nearest base station or covering satellite beam. However, the strongest pilot signal is generally used regardless of its transmission source, because it is clearly a signal the user can readily track and demodulate accurately.

Since the pilot carrier is transmitted at a higher power level than other typical carrier signals in the system, such as user signals or traffic channels, it has a greater signal-to-noise ratio and interference margin. The higher energy level of the pilot carrier enables a high speed initial acquisition search for this signal, and allows very accurate tracking of its phase using a relatively wide bandwidth phase tracking circuit. The carrier phase obtained from tracking the pilot carrier is used as a carrier phase reference for demodulating user information signals transmitted by base stations 14 and 16 and gateways 22 and 24. This technique allows many traffic channels or user signal carriers to share a common pilot signal for carrier phase reference.

Upon acquiring or synchronizing with the strongest pilot signal, the subscriber unit then searches for another signal, referred to as the sync or synchronization signal or channel which typically uses a different PN code having the same sequence length as the pilot. The synchronization signal transmits a message containing certain system information which further identifies the originating gateway and overall communication system, in addition to conveying certain synchronizing information for the long PN codes, interleaver frames, vocoders, and other system timing information used by a remote subscriber unit without requiring additional channel searching.

Another signal, referred to as the paging signal or channel, may also be used by the communication system to transmit messages indicating the status of calls or communication information that is present or is being 'held' for a subscriber at a gateway. The paging signal typically provides appropriate channel assignments for use when a user initiates a communication link, and requests a response from the designated subscriber unit.

To assist in synchronization, all of the regions within a communication system, or predefined smaller portions of the system, are supplied with accurate system wide synchronization information. In many embodiments, a Global Positioning System (GPS) type receiver is used by base stations or gateways to synchronize timing to Universal Coordinated Time (UTC). Accurate synchronization allows easy handoff between gateways for users moving from one service area to another. This timing synchronization is also used in communication systems using low earth orbit satellites to provide accurate satellite-to-satellite hand-off as gateways change which satellites are being used as they traverse their respective orbits.

Even when a communication link is established, a subscriber unit generally continues to scan the received pilot signal code at code offsets corresponding to neighboring cells, sectors, or beams, unless this feature is not activated for specific applications. This scanning is done to determine if a pilot signal emanating from another sector or cell is becoming stronger than the initially selected gateway or base station pilot signal. While operating in an inactive mode, where no calls or data signals are being processed, if such a higher signal strength pilot signal for another cell or beam is detected, the subscriber unit acquires that stronger pilot signal and corresponding sync and paging channels for the new gateway. Therefore, the subscriber unit remains prepared for establishing a quality communication link.

As illustrated in FIG. 1, pilot signals are transmitted to subscriber unit 26 from base stations 14 and 16 using outbound or forward communication links 30 and 36, respectively, and from gateways 22 and 24, through satellite 18 using links 40, 46, and 48. Circuitry in subscriber unit 26 is then used to make a determination which base station or gateway (satellite) services it should use for communication, that is, generally which cell or beam it is in, by comparing relative signal strengths for the pilot signals transmitted by base stations 14 and 16 or gateways 22 and 24. For purposes of clarity in illustration, in FIG. 1 satellite 20 is not shown as communicating with subscriber unit 26, although this may certainly be possible depending on the specific system configuration, satellite beam pattern distribution, and transfer of calls by MTSO 12.

In this example, subscriber unit 28 may communicate with base station 16 for terrestrial service purposes but with satellites 18 or 20 for gateway service purposes. When a call or communication link is initiated and a subscriber or remote unit changes to an active mode, a pseudonoise (PN) code is generated or selected for use during the length of this call. The code may be either dynamically assigned by the gateway or determined using prearranged values based on an identity factor for the particular subscriber unit. When subscriber unit 28 initiates a call, a control message is also transmitted to an appropriate base station or satellite gateway, here 16, 18, or 20. Either base station 16 or gateway 22 or 24, say through satellite 18, upon receiving a call request message, transfers the called number to system controller or MTSO 12, which then connects the call through the PSTN to intended recipients. Likewise, MTSO 12 can direct the call to another subscriber through one of the gateways or base stations.

Spread spectrum type communication systems, such as the example illustrated in FIG. 1, use a waveform based on a direct sequence pseudonoise spread spectrum carrier. That is, a baseband carrier is modulated using a pseudonoise PN sequence to achieve the desired spreading effect. The PN sequence consists of a series of 'chips' which have a frequency much higher than the baseband communication signal being spread. A typical chip rate is on the order of 1.2288 MHz and is chosen according to total bandwidth, desired or allowable signal interference, and other criteria relating to signal strength and quality which are known to communication system designers skilled in the art. Those skilled in the art appreciate how the chip rate can be modified according to allocated spectrum, in view of cost constraints and communication quality trade-offs.

In the base station- or gateway-to-subscriber link, the binary sequences used for spreading the spectrum are constructed from two different types of sequences, each having different properties and serving a different function. An 'outer' code is used to discriminate between signals transmitted by different base stations and between multipath signals. This outer code is typically shared by all signals in a cell, or beam, and is generally a relatively short PN sequence. However, depending on system configuration, a set of PN code sequences could be assigned to each gateway or different PN codes could be used by the satellite repeaters. Each system design specifies the distribution of orthogonal 'outer' codes within the system according to factors understood in the art.

An 'inner' code is then used to discriminate between the different users within a region or between user signals transmitted by a single base station, gateway, or satellite beam on the forward link. That is, each subscriber unit has its own orthogonal channel provided on the forward link by using a unique covering PN code sequence. On the reverse link, the user signals are not completely orthogonal but are differentiated by the manner in which they are code symbol modulated. It is also understood in the art that additional spreading codes can be used in preparing data for transmission such as to provide an additional level of 'scrambling' to improve the signal gain during subsequent reception and processing.

It is well known in the art that a set of n orthogonal binary sequences of length n, for n being a power of 2, can be constructed. This is discussed in the literature, such as in Digital Communications with Space Applications, S. W. Golomb et al., Prentice-Hall, Inc., 1964, pp. 45–64. In fact, sets of orthogonal binary sequences are also known for most sequences having lengths which are multiples of four but less than two hundred. One class of such sequences that is relatively easy to generate is called the Walsh function, also known as Hadamard matrices.

A Walsh function of order n over the real field can be defined recursively as:

$$W(n) = \begin{vmatrix} W(n/2) & W(n/2) \\ W(n/2) & W^*(n/2) \end{vmatrix}$$

where W* denotes the real inverse of W, and W(1)=1 (i.e. W*(1)=−1).

Therefore the first few Walsh functions or orders 2, 4, and 8 can be represented as:

$$W(2) = \begin{vmatrix} 1 & 1 \\ 1 & -1 \end{vmatrix},$$

$$W(4) = \begin{vmatrix} 1 & 1 & 1 & 1 \\ 1 & -1 & 1 & -1 \\ 1 & 1 & -1 & -1 \\ 1 & -1 & -1 & 1 \end{vmatrix}$$

and $$W(8) = \begin{vmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{vmatrix}$$

A Walsh function or sequence, then, is simply one of the rows of a Walsh function matrix, and a Walsh function matrix of order 'n' contains n sequences, each being n bits in length.

A Walsh function of order n (as well as other orthogonal functions) has the property that over an interval of n code symbols in a string of symbols, the cross-correlation between all of the different sequences within the set is zero, provided the sequences are temporally aligned. This is easily understood by observing that exactly half of the bits in every sequence differ from those in all other sequences. Another useful property is that one sequence always consists of all ones while all of the other sequences consist of half ones and half minus ones.

Several carrier waveforms can be used within communication system 10. In the preferred embodiment, a sinusoidal carrier is quadraphase (four phase) spread by a pair of binary PN sequences. In this approach, the spreading PN sequences are generated by two different PN generators of the same sequence length. One sequence bi-phase modulates an in-phase channel (I Channel) of a carrier signal and the other sequence bi-phase modulates a quadrature phase, or just quadrature, channel (Q Channel) of the carrier signal. The resulting signals are summed to form a composite four-phase carrier.

All signals transmitted by a base station or gateway share the same outer PN codes for both I and Q channels. As mentioned earlier, the signals are also spread with an inner orthogonal code generated by using Walsh functions. The Walsh function size n, is established according to the desired number of channels to be accommodated within the communication system. An exemplary number of channels found useful for a satellite repeater system is one hundred and twenty-eight (n=128) for the gateway-to-subscriber link. This creates up to one hundred and twenty-eight different communication signals or channels for a given frequency within each coverage region, each being assigned a unique orthogonal sequence. At least three of these sequences are dedicated to the pilot, sync and paging channel functions, with additional paging channels sometimes being used.

A signal addressed to a particular user is modulated by a particular Walsh code sequence, or sequence of Walsh sequences, assigned by the gateway or a communication system controller for use during the duration of that user's link or information transfer. This represents application of the inner code. The resulting inner coded signal is then multiplied by the outer PN sequences which are the same code, but shifted 90°, and applied to the I and Q channels, effectively resulting in bi-phase modulation for the outer code.

Neighboring cells, sectors, or other predefined geographical coverage regions can reuse Walsh functions because the basic outer PN codes used in such regions are distinct from each other. Differing propagation times for signals arriving at a particular subscriber's location from two or more base stations or satellite beams, mean that it is not possible to preserve an absolute time alignment for signals as required for maintaining Walsh function orthogonality for multiple cells at one time. Reliance is placed on the outer PN codes to discriminate between signals received from different gateways or base stations. However, all signals transmitted by a base station over a single satellite beam are orthogonal to each other and do not substantially contribute interference to each other. This eliminates a majority of the interference in most locations, allowing a higher capacity to be obtained.

The pilot waveform uses the all-ones Walsh code sequence that is found in all (real) Walsh function sets. The use of the all-ones Walsh code sequence for all pilot carriers allows the initial search for the pilot waveform to ignore the Walsh code sequences until after outer code PN synchronization has been achieved. The Walsh framing is locked to the PN code cycle since the length of the Walsh frame is a factor of the PN sequence length. Therefore, provided that base station or gateway offsets of the PN code are multiples of one hundred twenty-eight (128) chips (or the particular chosen Walsh frame length for communication system 10) then the Walsh framing is known implicitly from the outer PN code timing cycle.

In sync, paging, and voice or traffic channel signals, input data, such as digitized speech, is typically encoded, provided with repetition, and then interleaved to provide error detection and correction functions. This allows the communication system to operate with lower signal-to-noise and interference ratios. Techniques for convolutional or other types of encoding, repetition and interleaving are well known in the art. The symbols in the error correction encoded symbol stream for each channel are converted to real integers ('0' to a one and '1' to a minus one) and digitally multiplied by an assigned Walsh function or sequence for that channel and then digitally multiplied by the outer PN code after converting it to a sequence of the real field. The resulting spread symbol streams for each signal are then added together to form a composite waveform.

The resulting composite waveform is then modulated onto a sinusoidal carrier, bandpass filtered, translated to the desired operating frequency, amplified and radiated by the antenna system. Alternate embodiments of the present invention may interchange the order of some of these operations for forming a transmitted signal. For example, it may be preferred to multiply each voice channel signal by the outer PN coded waveform and perform a filtering operation prior to summation of all the channel signals to be transmitted. Summation may be accomplished at several different points in the processing such as at the IF frequency, or at the baseband frequency, either before or after modulation by a PN sequence. It is well known in the art that the order of linear operations may be interchanged to obtained various implementation advantages and different designs.

Figure 2:
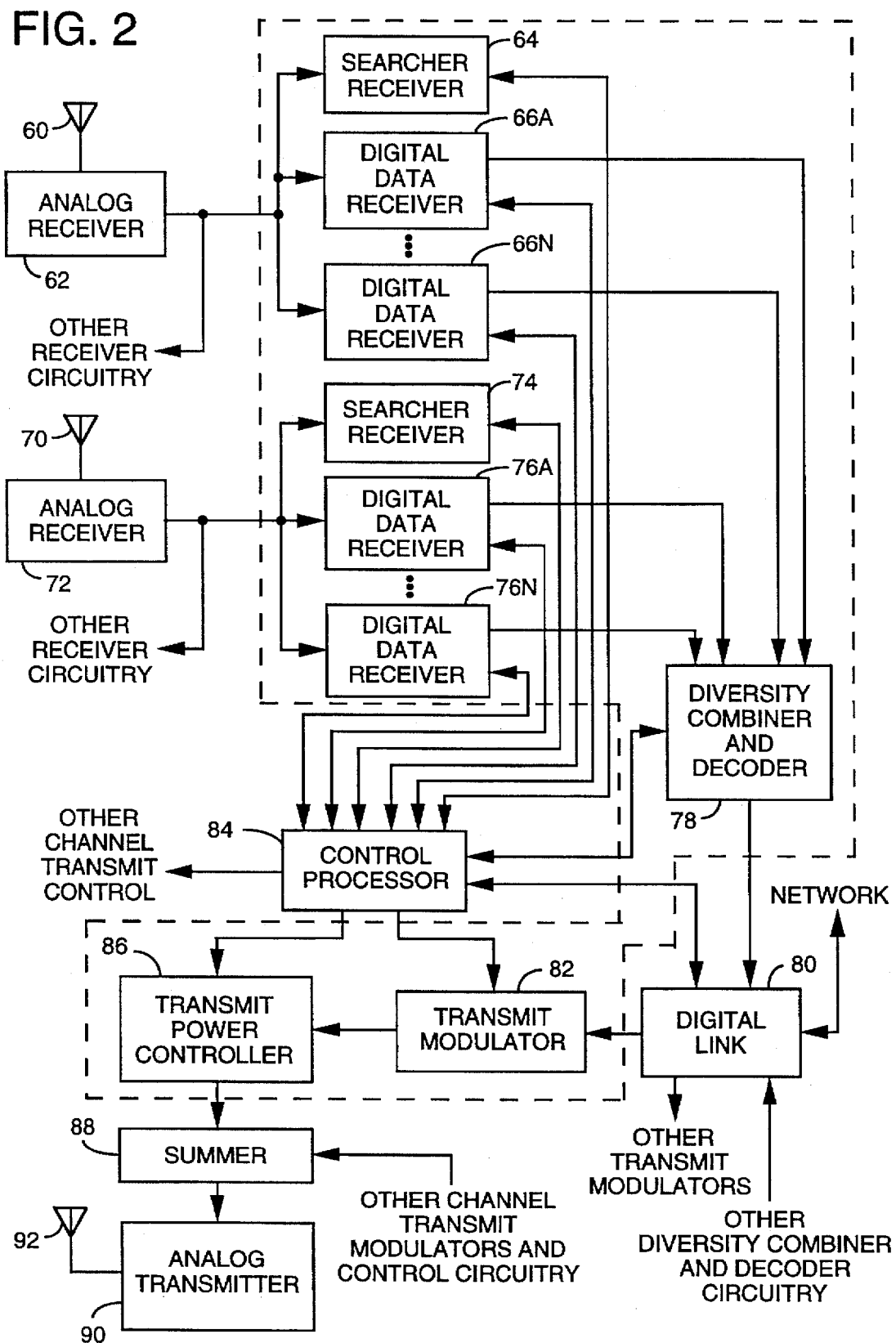
FIG. 2 illustrates a block diagram of exemplary gateway demodulation/modulation apparatus for a wireless CDMA communication system.

An exemplary embodiment of base station or gateway apparatus useful for implementing a CDMA communication system is illustrated in further detail FIG. 2. In the gateway demodulator/modulator of FIG. 2, at least two receiver systems are utilized with each having a separate antenna and analog receiver section for effecting frequency or space diversity reception. In base stations, multiple antennas are used to achieve space diversity reception, generally within sectors. In each of the receiver systems, the signals are processed in a substantially identical manner until the signals undergo a diversity combination process. The elements within the dashed lines correspond to elements used to manage communications between one gateway and one mobile subscriber unit, although certain variations are known in the art. The output of the analog receivers or receiver sections are also provided to other elements to be used in communications with other subscriber units.

The transceiver or demodulator/modulator portion of the gateway illustrated in FIG. 2, has a first receiver section with an antenna 60 for receiving communication signals, which is connected to an analog receiver 62 where the signals are downconverted, amplified, and digitized. Various schemes for RF-to-IF-to-Baseband frequency downconversion and analog-to-digital conversion for channel signals are well known in the art. Digitized signals are output by analog receiver 62 and provided as inputs to a searcher receiver 64 and at least one digital data receiver 66. Additional digital data receivers (66B–66N) are used to obtain signal diversity for each subscriber unit, which may be optional for some system designs, and form the fingers of a RAKE design receiver section. These additional data receivers, alone or in combination with other receivers, track and receive subscriber signals along several possible propagation paths and provide diversity mode processing.

The gateway also generally has additional receiver sections for accommodating communication signals at additional carrier frequencies, or using other distinguishing parameters. This is illustrated in FIG. 2 using a second such section which includes a second antenna 70, a second analog receiver 72, a second searcher receiver 74, and a second set of digital data demodulators 76A–76N. However, many such sections are typically used in gateways to accommodate all of the satellite beams and possible multipath signals being handled at any given time.

A diversity combiner and decoder 78 is coupled to the outputs of data receivers 66A–66N and 76A–76N and serves to combine these signals into one output which is then provided to a digital link or processing interface unit 80. Apparatus for constructing diversity combiner 78 is well known in the art and not illustrated further here. Digital link 80 is connected to a transmit modulator 82 for providing output data, and typically to a MTSO digital switch or network. Digital link 80 serves to control or direct the transfer of decoded, un-encoded, and encoded data signals between diversity combiner and decoder 78, the MTSO network, one or more gateway transmit modulators 82, and other such diversity combiners and decoders and gateway transmit modulators. A variety of known elements can be incorporated into or form digital link 80, including, but not limited to, vocoders and data modems and known digital data switching and storage components.

At least one gateway control processor 84 coupled to the sets of data receivers 66A–66N and 76A–76N, along with searcher receivers 64 and 74, digital link 80, and transmit modulator 82, provides command and control signals to effect functions such as, but not limited to, signal processing, timing signal generation, power and handoff control, diversity combining, and system interfacing with the MTSO. In addition control processor 84 assigns Walsh code sequences, transmitters, and receivers for use in subscriber communications.

Signals from the MTSO, within the communication system, or from other combiners, are coupled to an appropriate transmit modulator for transmission to a recipient subscriber using digital link 80 operating under the control of processor 84. Transmit modulator 82, also operating under the control of control processor 84, then spread spectrum modulates data for transmission to an intended recipient subscriber unit. The output of transmit modulator 82 is provided to a transmit power controller 86 which provides control over the transmission power used for the outgoing signal. This control assures the use of minimum power for purposes of interference, but appropriate levels to compensate as needed for attenuation in the transmission path. Control processor 84 also controls the generation and power of the pilot, sync channel, and paging channel signals and their coupling to a power controller 86 before being summed with the other signals and output to antennas.

The output of power controller 86 is provided to a summer 88 where it is summed with the output from other transmit power control circuits whose outputs are directed to other subscriber units at a common transmission frequency. The output of summer 88 is provided to an analog transmitter 90 for further amplification at the desired RF frequency and output to antenna 92 for radiating to subscriber units through satellite repeaters. As discussed earlier, base stations use one or two antennas for a cell or each sector, while gateways use several such transmitters and antennas to communicate with satellite repeaters.

Figure 3:
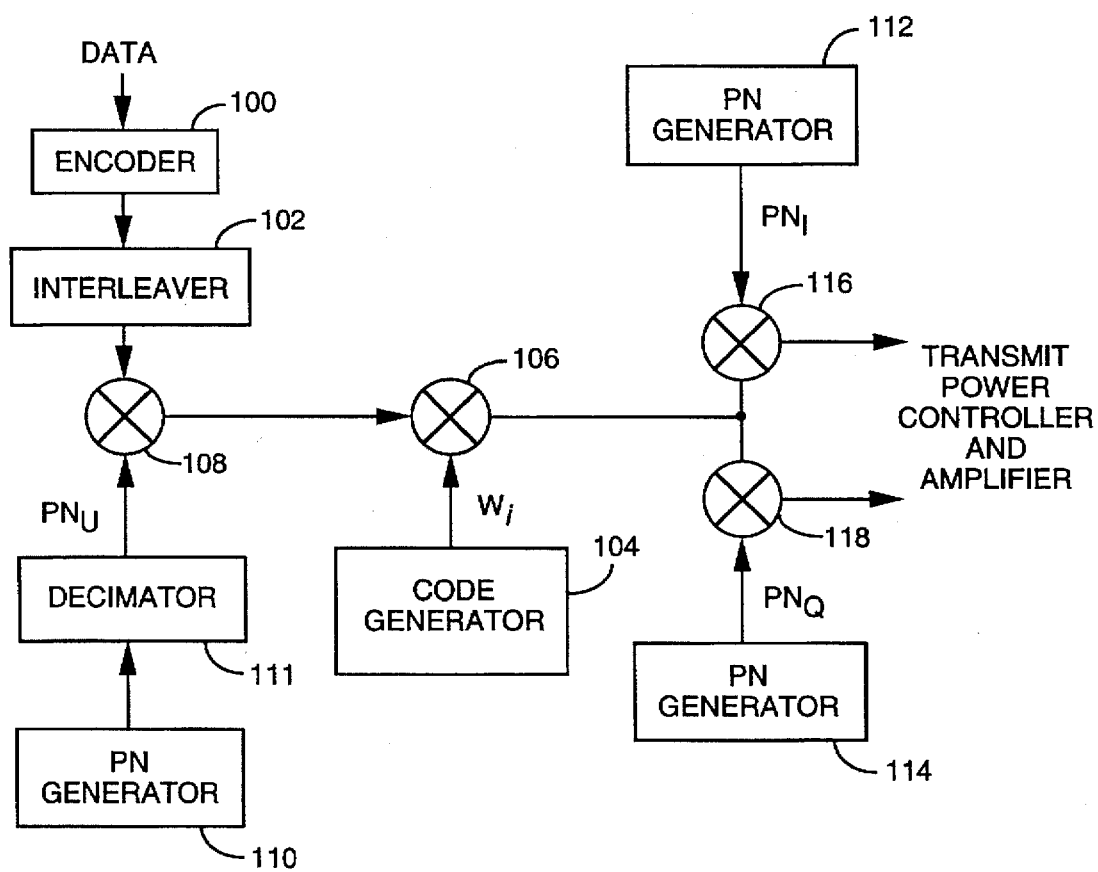
FIG. 3 illustrates a more detailed view of a typical transmit modulator useful in implementing the apparatus of FIG. 2.

An exemplary signal modulator design for implementing transmission modulator 82 is illustrated in FIG. 3. In FIG. 3, modulator 82 includes an encoder 100 and an interleaver 102. Prior to application of Walsh sequence coding, the signals carried by each channel are generally convolutionally encoded, with repetition, and interleaved using techniques known in the art.

The interleaved symbol stream or data from interleaver 102 is then Walsh encoded or covered with an assigned Walsh code sequence. The Walsh code is supplied by a Walsh code generator 104 and multiplied by or combined with the symbol data in a logic element 106. The Walsh function is typically clocked in at a rate of 9,600 Hz, while in an exemplary variable data rate system including voice, facsimile (FAX), and high/low-speed data channels, the interleaved data symbol rate may vary from approximately 75 Hz to 19,200 Hz (or as high as 76,800 Hz in some cases). The resulting coded waveform may then be multiplied in a second logic element 108, with a binary PNu sequence. This sequence is provided by a long PN code generator 110, typically also clocked at 1.2288 MHz, and then decimated in a decimator 111 to provide a lower rate signal, such as 9.6 kbps. In the alternative, logic element 108 could be connected in series with the output of multiplier 106 with the resulting covered data from multiplier 106 being multiplied by the PNu sequence. When the Walsh code and $PN_U$ sequences consist of binary '0' and '1' values instead of '−1' and '1', the multipliers can be replaced by logic elements such as exclusive-OR gates.

Code generator 110 generates a separate PN code sequence $PN_U$ corresponding to a unique PN sequence generated by or for each subscriber unit and can be constructed using a variety of known elements configured for this purpose. A subscriber unit address or user ID may be used to provide an additional factor for discriminating among system users. However, the $PN_U$ sequence format being used needs to conform to that of the Walsh codes. That is, either '−1/1' or '0/1' value sets are used together, so that conversion elements might be used on the output of a code generator to convert a '0/1' type sequence to a '−1'/1' type sequence as required. In the alternative, a non-linear encryption generator, such as an encryptor using the data encryption standard (DES) to encrypt a 128-symbol representation of universal time using a user specific key, may be utilized in place of PN generator 110 as desired. The $PN_U$ sequence is either assigned for the duration of a given link or permanently to one unit.

The transmitter circuitry also includes two PN generators, 112 and 114, which generate the two different short $PN_I$ and $PN_Q$ code sequences for the In-Phase (I) and Quadrature (Q) channels. In the alternative, these generators could be time shared among several receivers using appropriate interface elements. An exemplary generation circuit for these sequences is disclosed in U.S. Pat. No. 5,228,054 entitled "POWER OF TWO LENGTH PSEUDO-NOISE SEQUENCE GENERATOR WITH FAST OFFSET ADJUSTMENTS," issued Jul. 13, 1993, and assigned to the assignee of the present invention. These PN generators are responsive to an input signal corresponding to a beam or cell identification signal from the control processor so as to provide a predetermined time delay or offset for the PN sequences. Although only two PN generators are illustrated for generating the $PN_I$ and $PN_Q$ sequences it is readily understood that many other PN generator schemes may be implemented.

The Walsh encoded symbol data output by multiplier 106 is then multiplied by the $PN_I$ and $PN_Q$ code sequences using a pair of logic elements or multipliers 116 and 118. The resulting signals are then transferred to appropriate power control and amplification circuitry, transmit power controller 86 and analog transmitter 90. Here, they are modulated onto an RF carrier, typically by bi-phase modulating a quadrature pair of sinusoids that are summed into a single signal. These signals are summed with the pilot and any setup carrier signals, along with other voice carrier signals. Summation may be accomplished at several different points in the processing such as at the IF frequency, or at the baseband frequency either before or after multiplication by the PN sequence associated with the channels within a particular cell.

The resulting output signal is then bandpass filtered, translated to the final RF frequency, amplified, filtered and radiated by the antenna of the gateway. As was discussed earlier, the filtering, amplification, translation and modulation operations may be interchanged. Additional details of the operation of this type of transmission apparatus are found in U.S. Pat. No. 5,103,459, entitled "SYSTEM AND METHOD FOR GENERATING SIGNAL WAVEFORMS IN A CDMA CELLULAR TELEPHONE," assigned to the same assignee as the present invention and incorporated herein by reference.

Figure 4:
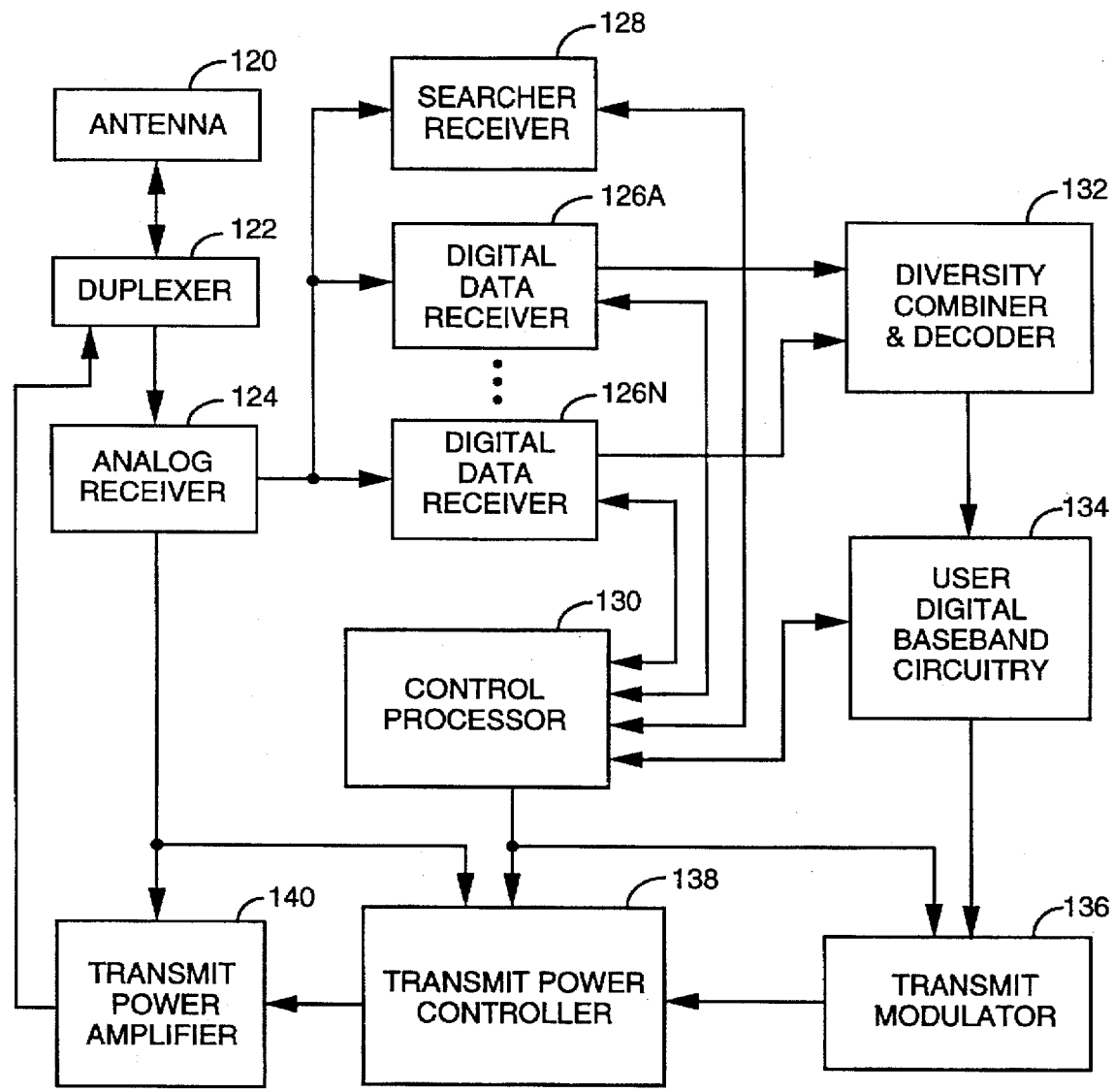
FIG. 4 illustrates a block diagram of exemplary subscriber unit demodulation/modulation apparatus.

An example of a subscriber unit transceiver or demodulator/modulator is illustrated in FIG. 4. As illustrated in FIG. 4, subscriber units have at least one antenna 120 through which they receive and transfer communication signals to an analog receiver or receiver system 124. This signal transfer generally occurs using a duplexer element 122 since the same antenna is used in typical installations for both transmit and receive functions, and each functional section (input and output) must be isolated from the other at any given time to prevent feedback and damage.

Analog receiver 124 receives analog communication signals and provides digital communication signals to at least one digital data receiver 126 and at least one searcher receiver 128. Additional digital data receivers 126B–126N are used, as before, to obtain signal diversity, which may be optional for some system designs. Those skilled in the art will readily recognize the factors that determine the number of digital receivers employed, such as typical level of diversity available, complexity, manufacturing reliability, cost, etc., which are used to provide an initial selection for this number. The gateway also has similar constraints, although far less limiting than for a portable subscriber unit.

The subscriber unit also includes at least one control processor 130 coupled to data receivers 126A–126N along with searcher receiver 128. Control processor 130 provides among other functions, basic signal processing, timing, power and handoff control or coordination, diversity, and diversity combining. Another basic control function often performed by control processor 130, is the selection or manipulation of Walsh functions or code sequences to be used for transmission and reception.

The outputs of data receivers 126A–126N are coupled to a diversity combiner and decoder 132 which provides a single output to digital baseband circuitry 134 within the subscriber unit. The timing and coordination of this transfer is generally controlled by processor 130. The baseband circuitry comprises the remainder of the processing and presentation elements used within the subscriber unit to transfer information to and from a unit user. That is, signal or data storage elements, such as transient or long term digital memory; input and output devices such as LCD or video display screens, speakers, keypad terminals, and handsets; A/D elements, vocoders and other voice and analog signal processing elements; etc., all form parts of the subscriber baseband circuitry which uses elements well known in the art. As shown in FIG. 4, some of these elements may operate under the control of, or in communication with control processor 130.

When voice or other data is prepared as an output message or communication signal originating with the subscriber unit, user digital baseband circuitry 134 is used to receive, store, process, and otherwise prepare the desired data for transmission. Baseband circuitry 134 in turn provides an output of this data to a transmit modulator 136 operating under the control of control processor 130. The output of transmit modulator 136 is transferred to a power controller 138 which provides output power control to a power amplifier 140 for final transmission of the output signal from antenna 120 to a gateway.

Returning to the input side of the subscriber unit, signals received by antenna 120 are processed by analog receiver 124 in a similar manner as illustrated for analog receiver 62 above in FIG. 2 where they are downconverted and amplified before being translated to an IF or baseband frequency and subjected to filtering and further amplification. The resulting amplified signals are then transferred to an A/D converter where they are digitized at an appropriate clock rate. As before, this A/D converter could easily reside in several sections within the subscriber unit circuitry. Digitized IF signals output from the A/D converter to data and searcher receivers 126 and 128 are combined I and Q channel signals. However, as also discussed before, the transferred signals could be in the form of separate I and Q channels.

Figure 5:
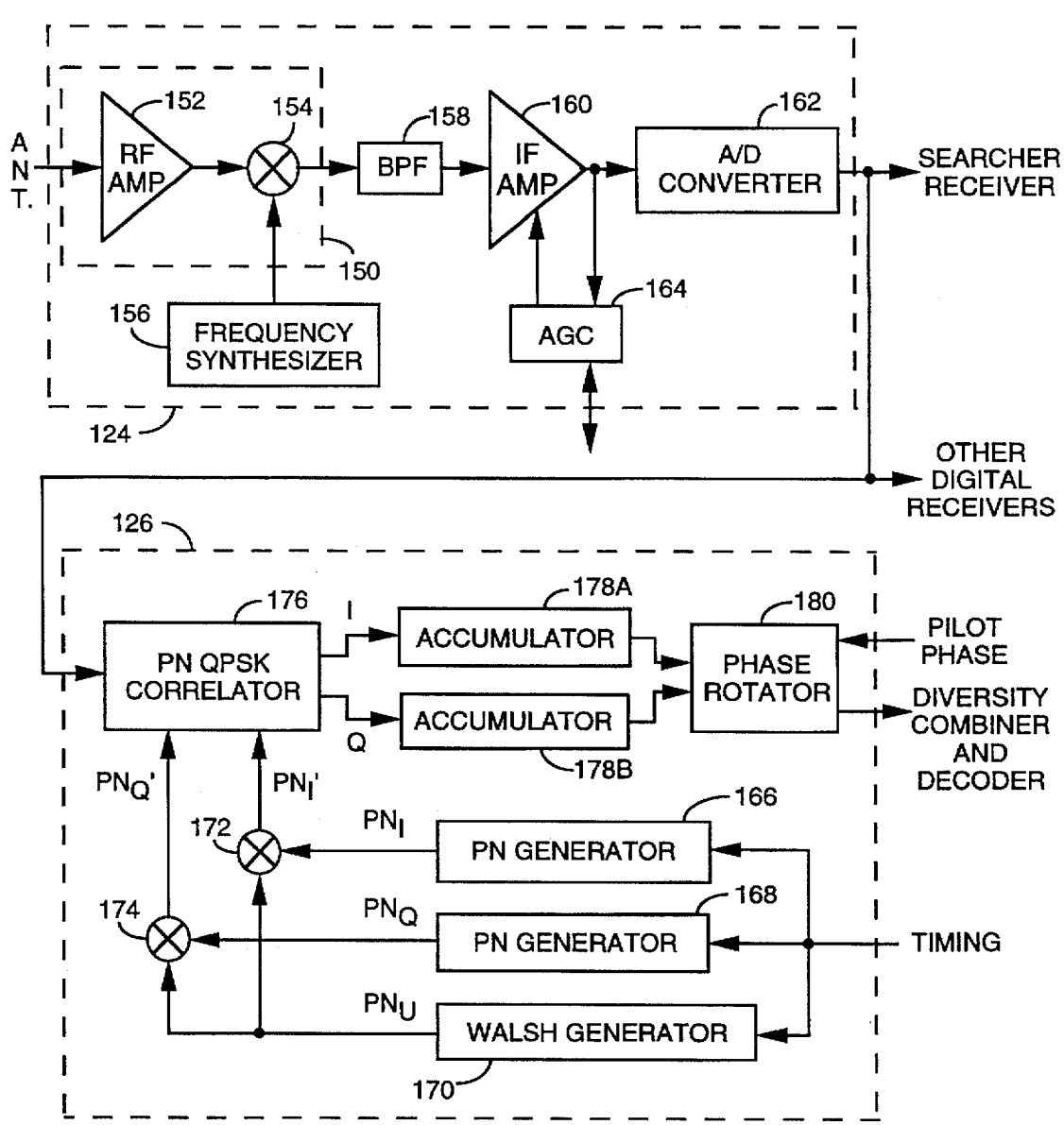
FIG. 5 illustrates a more detailed view of receiving portions of the apparatus of FIG. 4.

A more detailed view of analog receiver 124 is shown in FIG. 5. As seen in FIG. 5, signals received by antenna 120 are coupled to a downconverter portion 150 where the signals are amplified in an RF amplifier 152, and then provided as an input to a signal mixer 154. The output of a tunable frequency synthesizer 156 is provided as a second input for the mixer, and acts to translate the amplified RF signals to an IF frequency. The output of frequency synthesizer 156 can be electronically controlled as in the case of a VCO, using a frequency adjustment signal. As the received signal carrier is tracked by receiver 126 and the carrier frequency is affected by fading, Doppler shifting, etc., the output of synthesizer 156 might be used to at least partially compensate for the impact of these effects that are common to all diversity receiver fingers.

The IF signals are then transferred to a bandpass filter (BPF) 158, typically comprising elements such as, a Surface Acoustic Wave (SAW) filter with a desired passband and having characteristics chosen to match the desired waveform. The IF signals are filtered to remove noise and unwanted spectra and transferred to a variable gain IF amplifier 160 for further amplification.

In FIG. 5, a gain control element 164 is used to effect gain control over IF amplifier 160, which compensates somewhat for long term fading and other energy losses or attenuation in the received signal which lead to degradation during further processing. Gain element 164 provides a variable gain control function over the input signal and can be an electronically controlled gain device, such as would be known to those skilled in the electronics arts. Generally, a gain control signal is generated by subsequent portions of the demodulator as discussed further below.

This gain control function allows the receiver demodulator to operate without limiters and present the full bandwidth to the analog-to-digital converters which prevents a loss of information during processing. Also, gain control 164 can normalize the input signal to a predetermined level which allows the analog-to-digital conversion process to be more efficient. This is especially useful for purposes of the present invention since the transmission signals employed are generally power limited and the receiver may be called upon to compensate for a low energy signal level.

The resulting amplified IF signals produced by IF amplifier 160 are transferred to an analog to digital (A/D) converter 162 where they are digitized at an appropriate clock rate, as accomplished in the gateway. As before, although (A/D) converter 162 is illustrated as forming a part of receiver 124, it could easily reside elsewhere in the demodulation circuitry, for example forming a closely coupled part of either the digital data or searcher receiver, 126 and 128.

Digitized IF signals output from (A/D) converter 162 to data and searcher receivers 126 and 128 consist of combined I and Q channel signals. However, as before, those skilled in the art will readily appreciate that A/D converter 162 can be constructed so as to provide channel splitting and two separate A/D converter paths prior to digitizing the I and Q channels, rather than splitting the digitized I and Q channel signals after conversion. The second receiver section processes received communication signals in a manner similar to that discussed with respect to the first receiver section of FIGS. 4 and 5.

As shown in FIG. 5, the digitized I and Q channel signals from A/D converter 162 are input to a PN QPSK correlator 176 along with appropriate $PN_I'$ and $PN_Q'$ sequences produced within receiver 126. These latter sequences can be generated in a manner similar to that used in the gateway, as described above. Control processor 130 provides timing and sequence control signals to these generators.

In this approach, two PN generators 166 and 168 are used to generate the two different short code PN sequences, $PN_I$ and $PN_Q$, respectively, as the I and Q channel PN sequences for the outer code of the modulation scheme. An orthogonal code source such as a Walsh code generator 170 is used to provide an orthogonal code for use by the subscriber unit during a given communication link. Code generator 170 can be constructed using a variety of known elements configured for this purpose. The specific orthogonal, Walsh, code used is selected under the control of central processor 130, generally using 'set-up' information provided by the gateway, or MTSO 12, in the synchronization signal.

The code sequence output from generator 170 is logically combined, such as by multiplying or using an exclusive-OR operation, with the $PN_I$ and $PN_Q$ sequences in a pair of logic elements 172 and 174, respectively, to provide the sequences $PN_I'$ and $PN_Q'$. The $PN_I'$ and $PN_Q'$ sequences are in turn transferred to PN QPSK correlator 176. Correlator 176 correlates the I and Q channel data with the $PN_I'$ and $PN_Q'$ sequences and provides correlated I and Q channel outputs to a pair of accumulators 178A and 178B, respectively. Therefore, the (digitized) communication signal received by the subscriber unit is demodulated by both the user specific Walsh code sequence and the short code $PN_I$ and $PN_Q$ sequences.

Accumulators 178A and 178B collect and temporarily store symbol data provided by QPSK correlator 176 over a predefined time interval, for example one symbol or 128-chip period, and then input the data into a phase detector or rotator 180. Essentially data is converted from a serial symbol stream to parallel symbol sets by the accumulators for processing. At the same time, phase rotator 180 also receives the pilot signal from a searcher receiver and rotates the received symbol data signal in accordance with the phase of the pilot signal. The resulting channel data is output from phase rotator 180 to the diversity combiner and decoder where it is de-interleaved and decoded.

Another PN generator, not illustrated, may also be used for generating the PN sequence $PN_U$ corresponding to the subscriber unit specific PN sequence. This sequence is generally generated in response to a subscriber unit ID of some sort, although it may be provided from the gateway.

Unfortunately, the apparatus illustrated in FIG. 5, while useful, requires a fairly strong or robust pilot signal in order to adequately demodulate the communication signals. As discussed above, it is not always desirable nor possible to maintain a pilot signal with sufficient energy that it can be readily used in this process to demodulate the data signals. Therefore, a new technique has been developed according to the present invention which provides improved tracking of the input signal phase so that data or traffic channel signals can be quickly and reliably demodulated in receivers 126A–126N. In this technique, all or a substantial portion of the energy that is received by a subscriber unit from a gateway or communication signal source is used to track the phase of the communication carrier signal, including energy used for communication signals intended for other subscriber units.

A symbol clock is used by each of the PN code sources shown in FIG. 5 to establish timing for despreading and demodulating the incoming communications signals. If the symbol clock used by receivers 126 is not tracking the received signal timing accurately, then a correction or timing adjustment, either an increase or a decrease, in the clock timing is required. The degree to which the timing of the incoming signals and receiver 126 are the same, or aligned, is measured by sampling the pilot signal which provides a coherent signal for tracking system timing. This is typically accomplished using a time-tracking loop which comprises circuits well known in the art, such as phase locked loops, or what is referred to as 'early-late' sampling. That is, a correction signal can be generated by forming a difference between 'late' and 'early' samples of the pilot signal, which goes to zero when the offset samples are centered about the 'on-time' timing of the received signal. A signal from the time-tracking loop is then used to correct internal finger receiver timing in response to measured deviations from the timing of the pilot signal.

Figure 6:
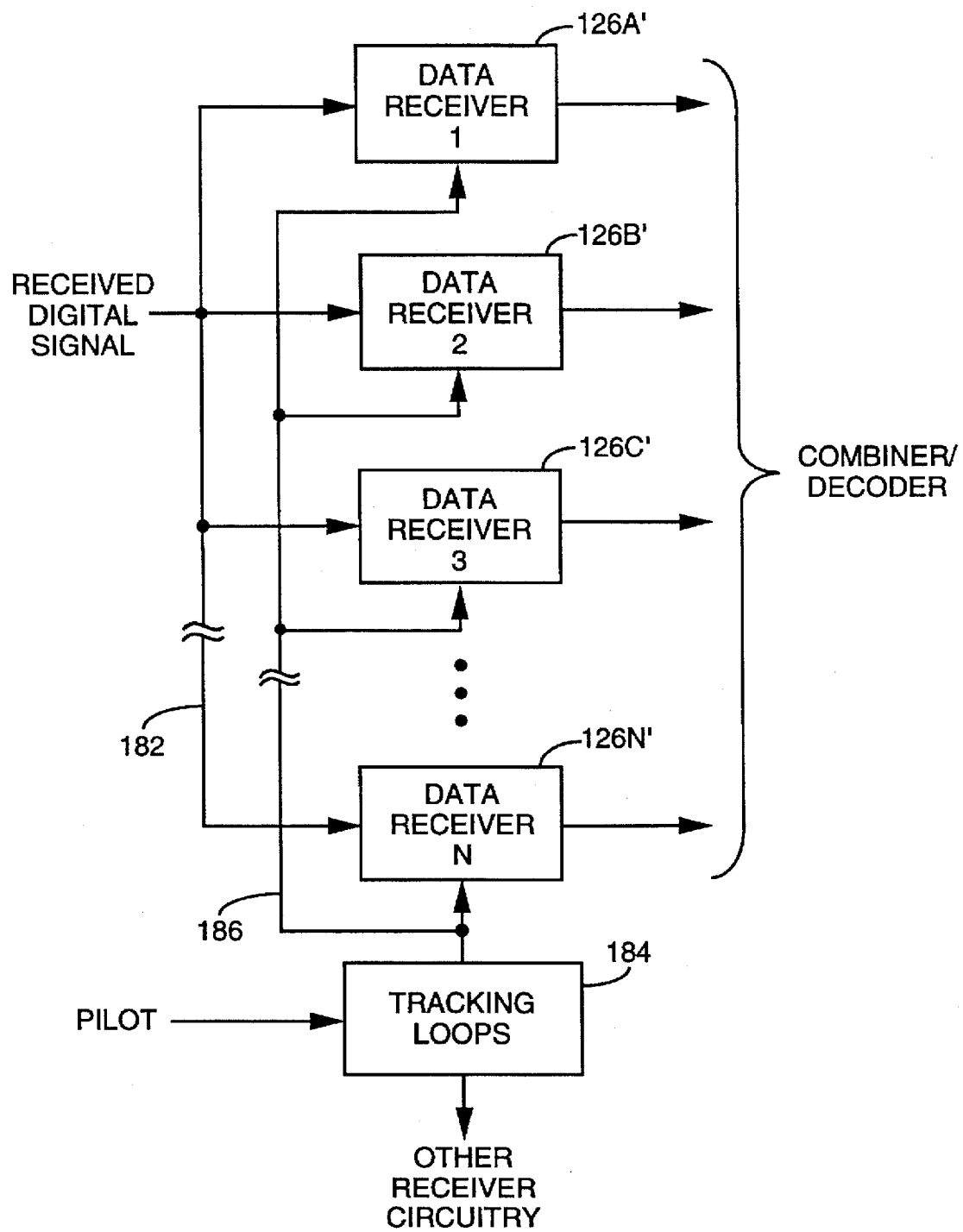
FIG. 6 illustrates a typical receiver timing loop control for use in the apparatus of FIG. 4.

This is illustrated in FIG. 6 where a series of receivers 126A, 126B, 126C, and 126N are shown receiving digital communication signals for one finger in a subscriber unit over an input signal bus or line 182. At the same time, using circuitry known in the art, the pilot signal is separated from the received signal carrier and input to frequency tracking loops 184. As previously stated, tracking loops 184 comprise circuitry known in the art for locking onto the frequency and phase of an input signal, such as, but not limited to, one or more phase-locked loops. As previously discussed, data receivers 126 are used to demodulate the same subscriber directed signal arriving over different signal paths (multipath). Each receiver adjusts its timing to match delays effected by different transmission path lengths.

Data receivers 126 and tracking loops 184 use a common symbol clock reference for establishing timing. Therefore, as tracking loops 184 lock onto the timing of the pilot signal, a correction signal is created which is provided over a timing line or bus 186 to the various data receivers to adjust their internal tracking or timing to be in phase with the input signal carrier. Each receiver then adjusts its timing to reflect the delay characteristic as previously discussed. The demodulated, uncovered, outputs from each of receivers 126 are then transferred to the appropriate diversity combining circuitry as previously shown.

While this approach allows tracking of a relatively strong pilot signal, it generally does not allow tracking of a carrier signal in the absence of the pilot signal. Nor does the approach shown in FIG. 6 function well when there is a very weak pilot signal, such as might occur in fringe reception areas, or near the boundaries of beams being projected by satellites viewed at low altitudes. The new method and apparatus utilizing some or all of the energy received on a common carrier frequency directed to other users or subscriber units, also labeled as other people's power, is shown in FIG. 7.

Figure 7:
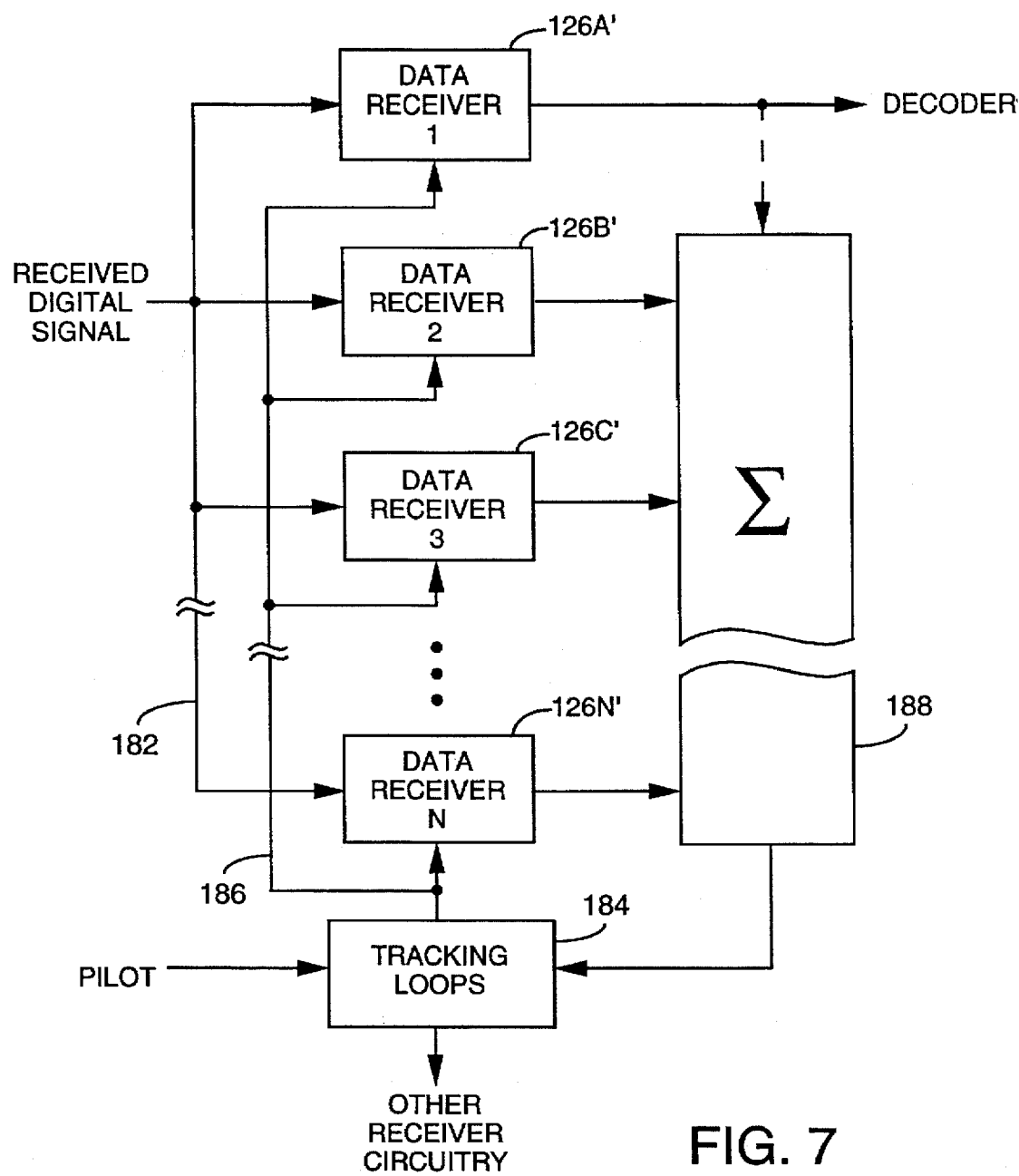
FIG. 7 illustrates a total power based timing loop control for use in the apparatus of FIG. 4 constructed and operating according to the principles of the present invention.

In FIG. 7, receivers 126A, 126B, 126C, and 126N are again shown receiving digital communication signals over input bus 182. Tracking loops 184 are also providing timing signals to the receivers over a timing, or correction, signal bus 186. However, instead of, or in addition to, using energy from the pilot signal for detecting received carrier phase, energy is also derived from communication signals intended for other users. This is accomplished by setting one or more of receivers 126 to demodulate the received signals using orthogonal codes, here Walsh functions, for other users active within the communication system.

The number of receivers 126 used for this function is determined by the total number available within the subscriber unit and the amount of energy desired to track the carrier signal. The amount of energy used may vary according to the presence or absence of a pilot signal and the specific operating environment of the subscriber unit. It may be preferred, for example, to only use a set of the strongest signals for this purpose, according to a predefined criteria. In addition, the desire to maintain signal multipath reception or diversity also impacts the number of receivers that can be dedicated to the gathering of other energy.

The outputs of those receivers that demodulate signals or channels for other users, here shown as 126B, 126C, and 126N, are transferred to a signal summation element or adder 188. In FIG. 7, part of the energy associated with the output from receiver 126A, which represents the desired subscriber signal or channel, is also shown by a dashed line as possibly being combined with the output of the other receivers. However, unless this is a particularly strong signal it is unlikely energy would be relinquished from this signal for this function.

Summation element 188 adds together these signals to form a single output signal which represents data symbols being transmitted by a gateway to other system subscribers over a common carrier and received by the subscriber unit of interest. The signal generated by summation element 188 is transferred as an input to timing loops 184 which can utilize the energy embodied in this signal to track the frequency and phase of the carrier signal. Where desired, the pilot can be used until it drops below a preselected level at which point the other subscriber's energy is used, alone or in combination with the pilot. Those skilled in the art of communication system design are familiar with specific system requirements and pilot and communication signal transmission attributes which affect the choice as to when to employ non-pilot signal energy to track carrier signals.

While this technique improves the ability of a subscriber to track communication signal carrier frequency and phase, other embodiments have also been developed that provide potentially more compact implementation within a subscriber receiver and provide multiple subscriber channel outputs from a single receiver. This is illustrated in further detail in FIGS. 8–9.

Figure 8:
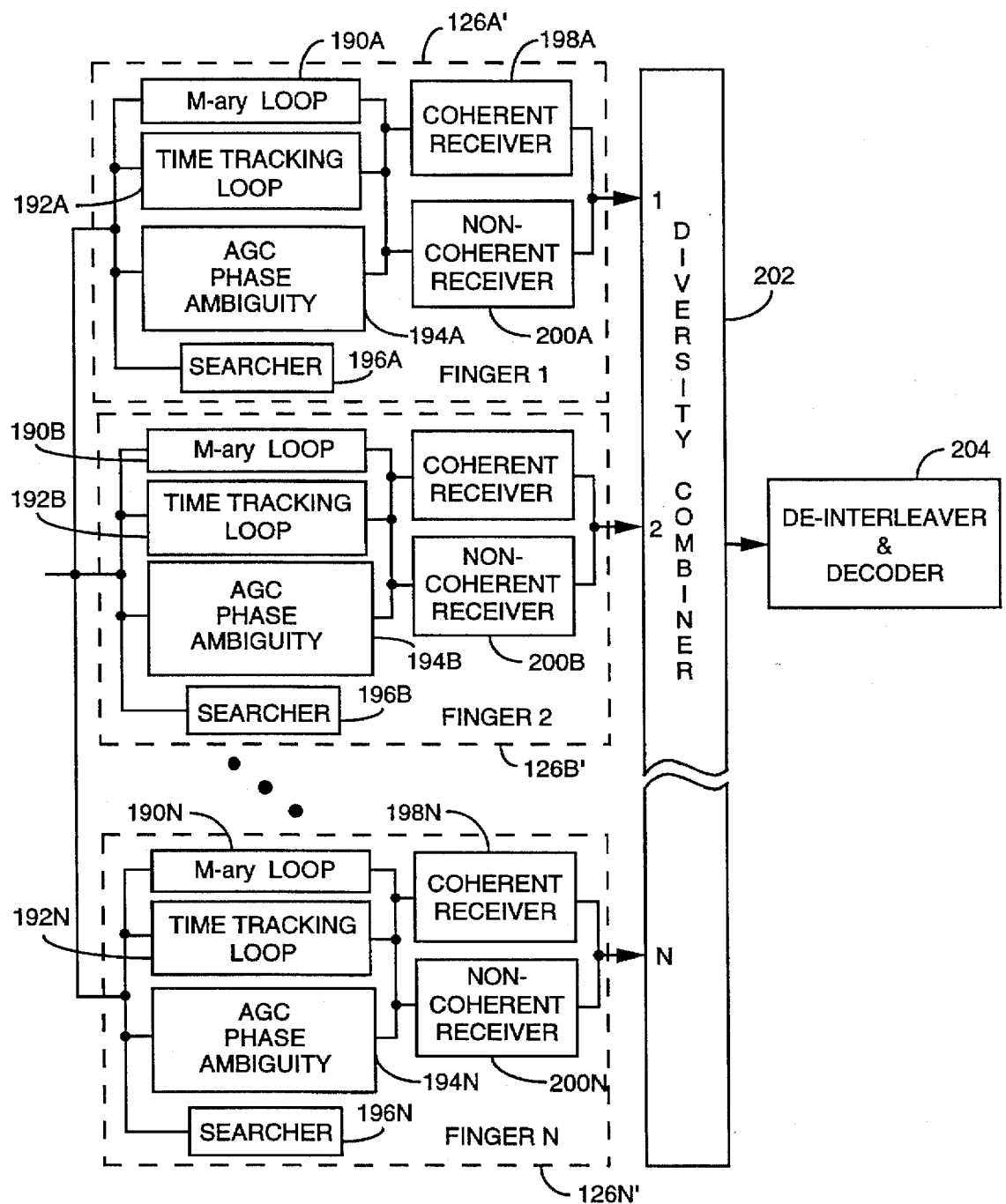
FIG. 8 illustrates a total power receiver for use in the apparatus of FIG. 4 for implementing both coherent and non-coherent signal demodulation.

Another exemplary embodiment of subscriber unit apparatus useful for implementing a multiple channel or user energy phase tracking receiver is illustrated in further detail FIG. 8. In the demodulator/modulator of FIG. 8, a series of subscriber unit receivers 126A'–N' are shown which employ a frequency/phase tracking circuit 190 also referred to as an M-ary Costas loop, or phase tracking loop, which is used to accurately track the phase and frequency of the carrier for received communication signals.

A time tracking loop 192 in each finger of the rake type receiver set also receives input communication signals from A/D converter 162 (not shown) and establishes time tracking for the carrier signal frequency. An AGC and phase ambiguity circuit 174 is also coupled to the input from A/D converter 162 and with an output of M-ary loop 190, and serves to establish gain control and signal relative received intensity (SRRI) values needed to establish parameters for input amplifier stages as well as for providing feedback information to the gateway, setting a transmission power level, and to resolve phase ambiguity.

The results of processing in these loops provide outputs for coherent and non-coherent signal demodulation such as in receivers 198 and 200, respectively. The resulting demodulation outputs from receivers 126A'–N' are combined in a diversity combiner 202 and then de-interleaved and decoded in de-interleaver/decoder 204.

Figure 9A:
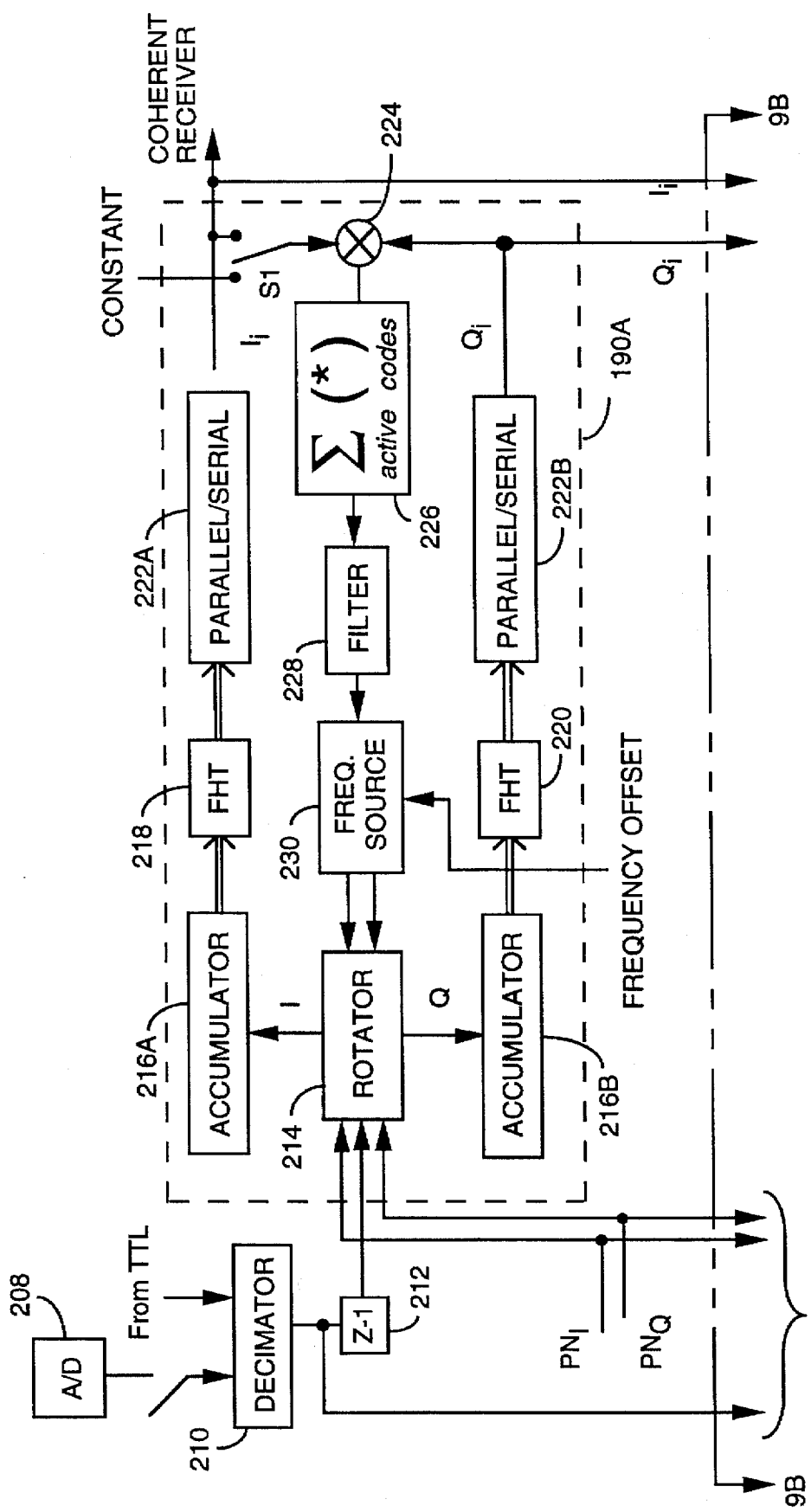
FIGS. 9A and 9B illustrate a single finger portion of a digital receiver used in the demodulation/modulation apparatus of FIG. 4 constructed and operating according to the principles of the present invention.
Figure 9B:
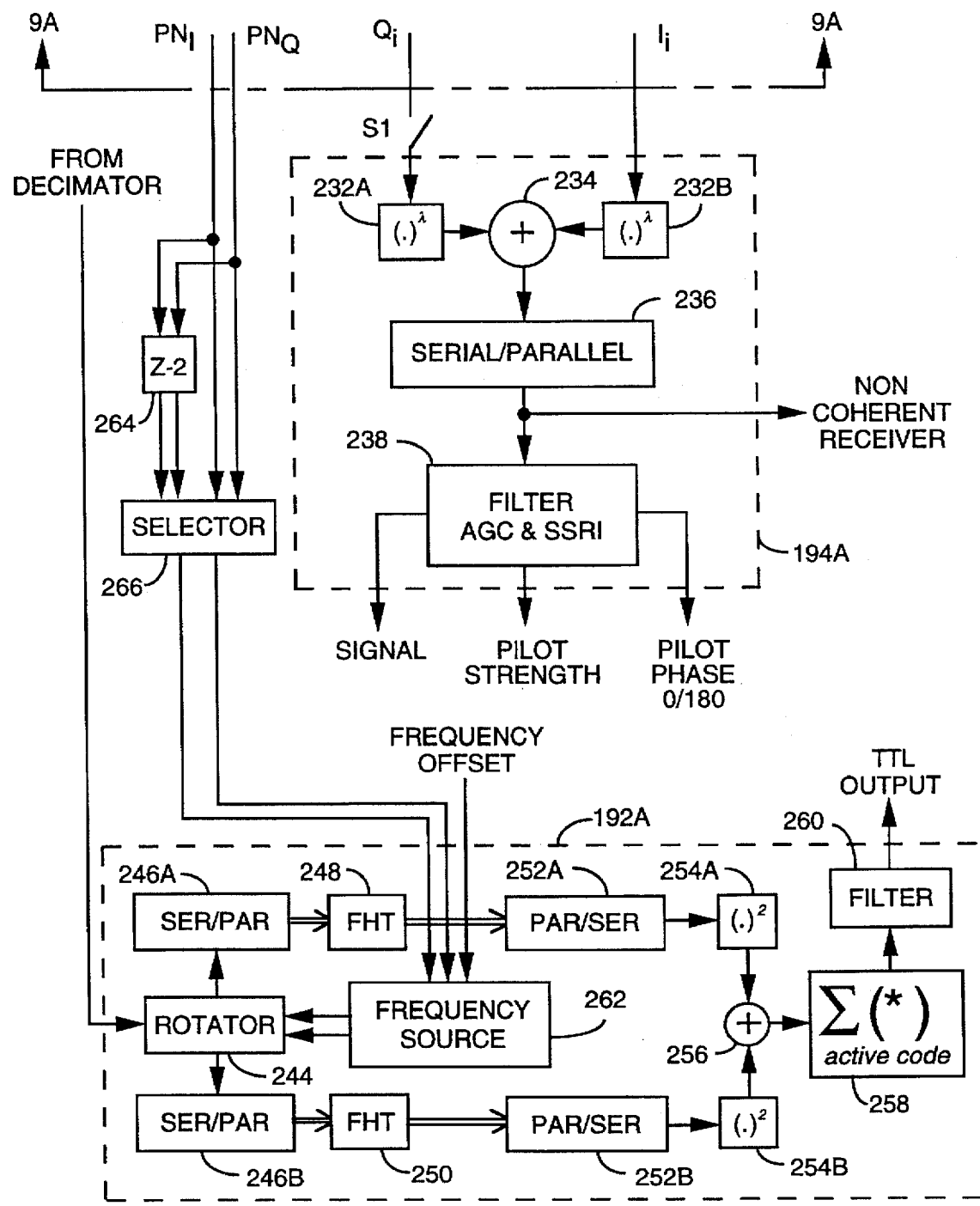

The structure of a single receiver 126' is illustrated in more detail in FIGS. 9A and 9B. For purposes of clarity in illustrating the present invention, a single-path demodulation scheme is presented in FIGS. 9A and 9B, to illustrate the operation of M-ary phase and time tracking loops, and other demodulation portions of receivers 126A'–126N' (and as desired in 66A–66N and 76A–76N).

Remote users or mobile subscriber units, such as 26 and 28, operating within the communication system, 10, each receive one or more signals R(t) that are broadcast from gateways 22, 24, etc., or base stations within the communication system. These signals are intercepted by subscriber unit antennas 120 and processed as discussed above to provide digital data signals. The received signals R(t) each have a relative random phase shift θ and relative time delay D with respect to internal phase and time references for the individual subscriber units.

Such received signals have a waveform or signal structure generally of the form:

$$R(t) = \tilde{I}(t-D) \cos(\omega_o t + \theta(t)) - \tilde{Q}(t-D) \sin(\omega_o t + \theta(t)) + n(t); \quad (1)$$

where θ(t) is an instantaneous phase offset which includes Doppler frequency shift, oscillator drift, and phase noise elements. The term n(t) represents an additive Gaussian noise with fixed power spectral density, or interference noise that is imbedded within the received signal. The $\tilde{I}$ and $\tilde{Q}$ terms designate the in-phase and quadrature portions or components of the received signals which generally have a transmitted form of:

$$\tilde{I}_n = PN_I \sum_{i=0}^{127} a_n(i) W_i; \quad (2)$$

and $$\tilde{Q}_n = PN_Q \sum_{i=0}^{127} a_n(i) W_i \quad (3)$$

where $W_i$ is a Walsh cover or function allocated to user i, $PN_I$ and $PN_Q$ are the spreading PN code sequences used for the I and Q channels, respectively, and $a_n(i)$ is the $n^{th}$ coded symbol for the $i^{th}$ user's signal.

The received signal is generally filtered and then translated to the desired baseband frequency, using a downconverter as discussed above, where I and Q phase channels or signal components are sampled at a rate of k times the spreading chip rates (i.e. $T_s = T_c/k$). The value used for k is preselected according to various known communication system operating parameters and constraints.

Sampling the I and Q portions of received signal R(t) provides sample values $R_I$ and $R_Q$ which follow the form:

$$R_I(nT_c + jT_s) = \tilde{I}(t-D) \cos \theta(t) - \tilde{Q}(t-D) \sin \theta(t) + n_{I,t=nT_c+jT_s} \quad (4)$$

$$R_Q(nT_c + jT_s) = \tilde{I}(t-D) \sin \theta(t) + \tilde{Q}(t-D) \cos \theta(t) + n_{q,t=nT_c+jT_s} \quad (5)$$

where $R_I$ and $R_Q$ constitute the original components $\tilde{I}$ and $\tilde{Q}$ plus some additive noise factor $n_i$, and $n_q$, respectively, having a zero mean and variance of $\sigma^2$.

These signals or sampled values must then be demodulated by the subscriber unit to recover the corresponding data carried by the signal for the intended recipient. A user receiver must perform several tasks in processing communication signals which generally includes operations such as, but not limited to, tracking the frequency and phase of the received signal, tracking changes in the time delay of the received signal, detecting energy in all Walsh functions used to cover, estimating a signal phase reference and energy levels, and then de-interleaving and decoding demodulated signals.

As seen in FIG. 9A, the frequency and phase tracking operation is accomplished using a frequency and phase tracking loop 190A that has a structure similar to an M-ary Costas loop. The new M-ary tracking loop exploits all or a substantial portion of the active user energy for a given communication channel or carrier frequency to establish frequency tracking. This provides improved frequency tracking either when the pilot signal being used is either very weak or erratic in signal strength, or even when there is no pilot signal. In addition, this approach provides for demodulation of all M users sharing the same frequency, beam, or gateway antenna.

The received signal, R(t), is transferred from an associated antenna structure through an A/D converter 208 and a decimator 210 to a delay element 212 in M-ary phase loop 190A. Decimator 210 serves to sample or select certain ones of the digital symbols output from A/D converter 208, such as every $8^{th}$, or others, as desired. The initial sampling points for this decimation are preselected, such as by using information stored in or provided by the communication the system, or selected by operation of controller 130 or similar control elements. The timing used by decimator 210 is adjusted in response to other elements within the receiver to maintain an appropriate decimation point while tracking an incoming communication signal.

Delay element 212 provides a delay time that is approximately the same length of time occupied by ½ chip ($Z^{-1}$) which assures proper timing for the remainder of the signal processing. Therefore, a delayed version of a sampled signal that is associated with a received signal arriving exactly at a Walsh symbol time $jT_s$ is output by delay element 212, and provided to a rotation element or phase rotator 214 where it is despread and rotated. This latter operation is realized by multiplying the incoming sampled signal by a complex despreading signal or PN sequence X, having the form:

$$(PN_I(n)-jPN_Q(n)) \cdot \exp(-j\phi(n)). \tag{6}$$

The phase value $\phi(n)$ represents an estimated phase for the incoming or received signal R(t) that is to be tracked and later demodulated. The M-ary phase loop commences operation at a random phase value which is then dynamically adjusted in response to a filtered error signal. If desired, the starting phase value can also be preselected based on communications history or other known factors, which can be stored in the subscriber unit and recalled by control processor 130.

As described earlier in relation to FIGS. 6 and 7, when the error signal has a zero value, no adjustment to the phase value is required and $\theta(n)$ equals $\phi(n)$. Otherwise, $\phi(n)$ either leads or lags $\theta(n)$ in phase and some amount of error correction is used to adjust the value of $\phi(n)$ until it equals $\theta(n)$. The appropriate error correction is obtained by separately demodulating in-phase and quadrature portions of the received signal and logically combining the results before applying active user orthogonal, Walsh, codes to generate a residual error value or signal.

In FIG. 9A, one output, the upper output, from rotator 214 is referred to as the upper tracking loop arm, or the in-phase arm (I-arm). The signal output to the I arm represents the rotator output resulting from multiplying the received signal by the sequence X, and taking the real value. The despreading of the input signal relative to the short codes used for spreading all communications from a particular cell is part of this operation. This code is used throughout the communication system with various off-sets, as discussed earlier, although different codes might be used in some applications. Therefore, this code is known, except for exact offsets, for the received signal even in the absence of a pilot signal.

The other output from rotator 214 is referred to as the lower tracking loop, or quadrature arm (Q-arm). The signal output to the Q arm represents the rotator output resulting from multiplying the received signal by X, and taking the imaginary value. Of course, the upper and lower designations are for purposes of convenience and illustration only, and do not denote any required physical circuit configuration.

The I and Q signals on these respective channels or signal transfer lines have the form:

$$I_n = \sum_{i=0}^{127} a_n(i) W_i \cos(\theta(n) - \phi(n)) + N_I \tag{7}$$

$$Q_n = \sum_{i=0}^{127} a_n(i) W_i \sin(\theta(n) - \phi(n)) + N_Q \tag{8}$$

and carry all of the modulated information being transmitted on the forward communication link for all system users sharing that link or communication signal frequency, subject to the impact of noise on the signals. At this point, the signals represent a stream or series of encoded data symbols.

The value $W_i$ represents each individual Walsh cover sequence (orthogonal code) used in the communication system. The maximum value for i typically ranges between 64 and 128, and depends on the specific communication system design, as will be readily apparent to those skilled in the art. Higher values may be employed in future systems. This allows for approximately 64 or 128 orthogonally encoded channels within each segregated region or communication channel (cell, sector, etc.) of the communication system.

The I and Q signals are input to accumulators 216A and 216B, respectively, where symbols are accumulated into groups or blocks for further processing. This step is the same as converting the data symbol stream from serial-to-parallel input format for the next stage. The size of the blocks being accumulated is determined according to the input structure of the next stage. The symbols are then transferred to symbol transformation circuits 218 and 220, respectively, where they are initially demodulated to produce streams or strings of data bits. These circuits are generally configured as Fast Hadamard Transformers (FHTs). The $i^{th}$ output of both the upper and lower FHTs 268 and 220 have the form:

$$I_n(i) = a_n(i) \cos(\theta(n) - \phi(n)) + N_I(i) \tag{9}$$

and $$Q_n(i) = a_n(i) \sin(\theta(n) - \phi(n)) + N_Q(i) \tag{10}$$

where $N_I(i)$ and $N_q(i)$ represent the noise components corresponding to each $i^{th}$ output or user channel in the received signal.

The information bits provided as outputs from FHTs 218 and 220 are input to parallel-to-serial converters 222A and 222B, respectively, where they are transferred in several bits at a time but transferred out at a slower rate in the form of a serial data stream. That is, parallel-to-serial conversion of the data stream format occurs. The accumulator outputs are provided to a multiplier 224, where the in-phase data $I_i$ and quadrature data $Q_i$ are multiplied together. Note that this data is multiplied together in a 'pairwise' manner, thus, the subscript notation when referring to these data values. That is, data from the I and Q channels that corresponds to the same data (position) for the same user is multiplied together. The product generated in multiplier 224 is then transferred to a summation circuit 226. Summation circuit 226 accumulates and sums the products, for each $I_i/Q_i$ pair, over multiple, or all, of the known active Walsh code sequences or user channels for the frequency being tracked to generate an error signal, e(n), of the form:

$$e(n) = \frac{1}{2} \sin(2(\theta(n) - \phi(n))) \cdot \sum_{i=0}^{127} a_n^2(i) + \tag{11}$$

$$\sum_{i=0}^{127} a_n(i) \cdot (N_I(i) \cdot \sin(\theta(n) - \phi(n)) + N_Q(i) \cdot \cos(\theta(n) - \phi(n)) +$$

$$\sum_{i=0}^{127} N_Q(i) N_I(i)$$

The process by which the error signal e(n) is generated is a random process with a mean, E(e(n)), and variance, $\sigma^2$, of:

$$E(e(n)) \approx \frac{1}{2} \sin(2(\theta(n)) \cdot n_{active} \tag{12}$$

and $$\sigma_e^2 = E(e(n) - Ee(n))^2 = (\sigma_n^2 + \sigma_n^2 \sigma_n^2) \cdot n_{active}, \tag{13}$$

respectively.

The resulting error signal e(n) output by summation circuit 226 is passed through a first or second order loop filter 228 to remove unwanted frequency components and noise from the multiplication process, and then transferred as a narrow band input to a frequency source 230. Frequency source 230 represents an adjustable output frequency source that provides an output for correcting the estimate of the incoming signal phase. The output of frequency source 230 changes in response to changes in value for the input error correction signal from filter 228.

Frequency source 230 can be manufactured using several known structures and approaches with a typical structure being that of a digital frequency synthesizer. Frequency source 230 can be configured to provide an output with an offset portion that approaches zero in value as the input error correction signal also approaches zero. In the alternative, frequency source 230 can employ a threshold or reference value for comparison to the error signal and decrease the offset phase value to zero when this reference level is reached. As shown in FIG. 9A, a frequency offset value can be input into frequency source 230 to provide the ability for pre-compensation for certain signal transmission paths or to overcome well known Doppler or other reproducible effects, as desired, without requiring the remainder of the circuitry to expend time providing full compensation.

The actual value for the phase used by rotator 214 consists of three components. These components are: the phase correction from the filter, phase due to correction for Doppler shift, and a phase used for despreading operations. The value of the error correction signal output from summation circuit 226 approaches zero, or a corresponding phase offset or threshold value, as $\theta(n)$ approaches $\phi(n)$. When the two phase angles are equal, the data being presented at the outputs of parallel-to-serial converters 222A and 222B, represents the data for all active users of the gateway being monitored by receiver 126A'. This will also be true for each receiver being used to receive a communication signal over a particular path.

If the output data from FHTs 218 and 220 are squared and then summed together, sufficient information is provided for estimating energies. This is the basic operation undertaken in AGC and phase ambiguity circuit 194A shown in FIG. 9B. Since the in-phase and quadrature signals can vary greatly and change signs during initial acquisition and tracking, they are first squared and then summed together to prevent cancellation. The results of this operation are also used as a control signal to adjust the gain provided by variable gain control 164, depending on the decrease or increase in relative signal strength for received communication signals. The sum of the $I^2$ and $Q^2$ signals provides a signal indicative of the relative energy or power level of received signals.

As seen in FIG. 9B, the outputs of converters 222A and 222B, which hold the in-phase data $I_i$ and quadrature data $Q_i$, respectively, are coupled to a pair of adjustable exponent (squaring) multiplier elements 232A and 232B, respectively, where the data are multiplied against themselves, or squared. The resulting products are input to a summation element or adder 234 where they are added together in a pairwise manner, to provide a measure of the power of the signals. The addends from adder 234 are then transferred to a serial-to-parallel converter 236 where they are formed into a single signal. The exponents for multipliers 232A and 232B are shown as a variable '$\lambda$' which is selected as having a value of 2 for all signals except for when the signal being tracked is a pilot signal, then the value is set at 1. This prevents the use of squaring for unmodulated pilot signals where the Walsh cover code may be all zeroes.

The accumulated values in serial-to-parallel converter 236 are provided as an input to a signal level estimator and filter 238. Estimator and filter 238 produces a long-term average of the sum of $I^2$ and $Q^2$ for every $i^{th}$ output of the FHTs. This long term average provides information regarding the relative strength of the communication signal and any pilot signal. The final output of this filter is compared to a known threshold value in order to establish whether or not a particular subscriber channel is active.

At the same time, using long-term averaging of the amplitude of the in-phase component, allows the filter output to establish a relative value for pilot signal phase with respect to the phase of M-ary phase loop 190A. This output of the filter is used for resolving any 180° ambiguity in the results otherwise obtained during the M-ary phase loop processing. The time constant for this filter can be on the order of a chip frame when the probability of a 180° phase jump is relatively small. In very fast fading environments the time constant for this filter can be in the order of a few Walsh symbols in order to recover the phase ambiguity as soon as the M-ary phase loop is locked onto the received signal after a deep fade.

If a pilot signal is available for use in the communication system or in the signals being monitored by the specific subscriber unit, it is preferable to add any estimate of phase available from pilot signal information as directly to the phase adjustment information as possible. It is desirable to avoid any further losses to this information which would otherwise occur if it is submitted to the multiplying operations of multiplier 224. One method of accommodating this is shown in FIGS. 9A and 9B where a switch S1 is used to redirect the output of the Q channel for the M-ary phase loop to be added directly to the filter input for some channels. In another method, the switch is not used at all (the pilot channel is treated as a regular data channel) and the I channel flips its polarity if the phase ambiguity circuit decides that the M-ary phase loop is locked onto a 180° shifted phase.

To establish and maintain appropriate timing for receiver 126A' relative to receiving communication signals or a carrier signal, a time-tracking loop (TTL) is provided, as shown in FIG. 8. In FIG. 8, time-tracking loop 192 corrects internal finger timing in response to measured deviations of the timing for received signals relative to that of the finger. These corrections account for time shifts impressed on the incoming signal due to code Doppler, changing positions of subscriber units compared to the satellites, or certain multipath conditions.

The degree to which the timing of the incoming signals and receiver 126' are the same, or aligned, is measured by sampling the impulse responses of an incoming data stream at an offset from the nominal chip time. This offset is either plus or minus half a chip period and is referred to accordingly as either late or early, respectively. If the offset data differs in timing from the nominal despread incoming signal peaks symmetrically, the difference between 'late' and 'early' sampling values is zero. That is, a value created by forming a difference between the 'late' and 'early' signals goes to zero when the offset is centered about the 'on-time' timing of the received signal R(t).

If the symbol clock used by receivers 126' is not tracking the received signal timing accurately and is fast relative to the incoming signal data, then the late-minus-early difference produces a correction signal with a positive value. On the other hand, if the symbol clock is running too slow, the difference produces a correction signal with a negative value. It is readily apparent that an inverse or other relationship can also be employed as desired.

The apparatus for implementing this operation in receiver 126A' is shown in the lower portion of FIG. 9B, where the received digital communication signal is transferred from the output of decimator 210 to the input of a phase rotator 244 in time-tracking loop 192A. In FIG. 9B, an upper output from rotator 244 is referred to as the upper time tracking loop (TTL) arm, or the in-phase arm or I channel. The other output from phase rotator 244 is referred to as the lower time tracking loop arm, quadrature arm, or Q channel. The signal output from rotator 244 to the I channel represents the phase rotator output corresponding to despreading an input signal relative to the $PN_I$ short code, while the output to the Q channel the rotator output corresponds to despreading an input signal relative to the $PN_Q$ short code. Of course, the upper and lower designations are for purposes of convenience and illustration only, and do not denote any required physical circuit configuration.

The I and Q signals are input to serial-to-parallel converters 246A and 246B, respectively, where symbols are accumulated into blocks for further processing, that is, they are converted from a serial to a parallel input format for the next stage. The symbols are then transferred to code symbol transformation elements or Fast Hadamard Transformation circuits 248 and 250, respectively, where they are initially demodulated to produce streams or strings of data bits in a manner similar to that of M-ary phase loop 190A.

The information bits provided as outputs from FHTs 248 and 250 are input to parallel-to-serial converters 252A and 252B, respectively, where they are reformatted into a serial data stream. That is, parallel-to-serial conversion of the data stream format occurs. The converter outputs are provided to a pair of squaring multiplier elements 254A and 254B, respectively, where the in-phase data $I_i$ and quadrature data $Q_i$ are multiplied against themselves or squared. This effectively provides a relative magnitude for the I and Q data and removes the sign from consideration.

The square products generated in multipliers 254 are then transferred to a summation circuit or subtractor 256 where the difference between these products is generated in a pairwise fashion. It is assumed that as the timing of the receiver and received signals are aligned with each other, this difference goes to zero. In the alternative, the products can be added together in a pairwise fashion and the sum compared against an offset or threshold value. Here, the addend goes to a maximum value when the appropriate timing is achieved.

The resulting addends in summation circuit 256 are in turn transferred as an output to a summation circuit 258 where the products, for each $I_i/Q_i$ pair are accumulated and summed over all of the known active Walsh code sequences for the frequency being tracked. This resulting summation signal is output by summation circuit 258 and passed through a second order filter 260 to remove unwanted frequency components and noise from the multiplication process, and then transferred as a narrow band input signal to decimator 210. This provides a timing signal used by decimator 210 to maintain an appropriate decimation point for sampling input signals.

The TTL signal output from filter 260 to decimator 210 is used to adjust the timing of a counter or sample clock (not shown) used in determining the timing for selecting data samples. This provides adjustments to the timing so that proper synchronization with the chip rate in the received signal occurs. That is, the decimation point is properly set for the input waveform or carrier frequency being tracked. If the timing of receiver 126' is correctly aligned with communication signal R(t), no adjustments to operation are made. However, as the timing differs from the received signal, the output of filter 260 increases or decreases in value and this information, or value, is used to retard or advance an associated I and Q PN counter. The correction signal adjusts the PN I and Q counter in decimator 210 until a correct setting is reached for which the receiver timing is correlated to the received signal timing.

Returning to the input side of time tracking loop 192A, phase rotator 244 receives the output of a frequency source, here provided as a digital frequency synthesizer 262, as a phase setting reference. Frequency synthesizer 262 receives the $PN_I$ and $PN_Q$ code sequences and provides the appropriate phase rotation output. To provide the early/late sampling desired for determining the relative timing of the receiver with respect to incoming signals, the $PN_I$ and $PN_Q$ sequences are either transferred with or without delay being imposed. That is, when transferred directly without any additional delay, the $PN_I$ and $PN_Q$ sequences are 'early' with respect to the output of delay element 212. When transferred with a delay of one full chip interval, the $PN_I$ and $PN_Q$ sequences are 'late' with respect to the output of delay element 212.

A delay element 264 is connected in series with one pair of $PN_I$ and $PN_Q$ inputs and is used to create the one full chip interval delay ($Z^{-2}$). The output of delay element 264 and the non-delayed input lines for the $PN_I$ and $PN_Q$ sequences are provided as inputs to a sequence selector 266 which determines which set of values frequency source or synthesizer 262 is using at a given time.

Once the phase tracking has been properly locked onto an incoming communication signal, the actual decoding or demodulation of the data can occur to provide the subscriber unit with the information being transferred in the communication signals along the communication link. As shown in FIG. 8, this is accomplished by transferring the resolved I channel data to combiner 202 and then de-interleaver and decoder 204, remembering that both the I and Q channel contain all of the information being transferred over the communication link.

For coherently combining signals output from more than one beam 10 (or channel communication path), the outputs for the in-phase channel are scaled before combining. For non-coherent combining, the outputs of the energy detector in AGC and filter element 194A for the $i^{th}$ user are scaled before combining. In some situations, a subscriber unit receives transmissions using two, or more, beams. One beam may transmit using coherent modulation, such as where a pilot signal is readily detectable, while the other beam transmits with non-coherent modulation, as where there is no discernible pilot signal. In this situation, combiner 202 combines the outputs of the two fingers such that the forward error rate (FER) is minimal.

The information is then de-interleaved and decoded, such as by using a convolutional decoder at the predetermined decoding rate to remove the interleaved error detection bits, and then transferred to an appropriate vocoder and other analog circuitry such as preamplifiers, amplifiers, and speaker systems, or visual display devices where a communication system user can utilize it.

One feature of the invention, as shown in FIG. 9, is that when communication signals undergo processing in FHT elements 218 and 220, the number of outputs is equal to M where M corresponds to many or all of the active subscriber units, and other modulated signals (here M<128, M≈127). Therefore, signals and data for all user signals on a common carrier can be detected and demodulated by receiver 126' without requiring additional receivers and components. This provides a great deal of flexibility in tracking and manipulating the data in different communication channels on a given frequency.

Each of the receiver fingers illustrated in FIG. 8 is also shown using a searcher receiver engine or circuitry 196 which allows searching for beams that may provide increased signal levels over those already being used or tracked. Since, there may be a very weak or non-existent pilot, the searcher needs to acquire the overall carrier for the gateway and compare that with adjacent signals. While searcher receiver 196 can comprise a separate circuit such as in the case of searcher 128, it is also possible to employ the M-ary Costas loop with an open switch S1 to accumulate the energy and determine the best signal.

The searcher steps through a set of PN timing offsets in pairs, one offset being referred to as the on-time hypothesis and the other as the late hypothesis, and estimates the transmitted energy for each orthogonal code or Walsh cover at each time and frequency hypothesis. The energy estimates are provided as an input to a processing element such as, but not limited to, a microprocessor, using a dedicated input such as a DMA channel, for further processing and evaluation. A portion of control processor 130 may service this function. This stored energy level information is then used to determine which offset provides the maximum signal strength and to select optimal timing offsets for use in signal demodulation for that finger. In this manner, each finger is optimizing its relative choice of signal at all times.

Searcher receiver 196 performs carrier signal searches substantially autonomously until the search set has been exhausted. When used in receivers 126A'-N', the searching operation generally involves using an additional bias term as an input which provides a frequency offset value, and this searching process is generally run as an open loop process.

Searcher receiver 196 first commences operation with one or more predetermined initial parameters, such as, but not limited to, values for the temporal search window size, frequency, integration time, threshold, etc. These values can be stored in a memory element, such as a ROM circuit, or in control registers for a microprocessor or similar dedicated control device which supervises the searcher engine operation, and loaded as part of an initialization process for the subscriber unit, or when entering a reset or communication mode, etc.

What has been described then is a new method and apparatus for tracking the frequency and phase of signal carriers in a spread spectrum communication system. The phase reference determination technique allows a carrier frequency to be accurately tracked in the presence of very weak, or even non-existent pilot signals (when non coherent modulation is used), and provides a more efficient use of signal energy by using all or a substantial portion of the received signal energy having a common carrier frequency to determine the carrier phase instead of being limited to a single communication channel on that carrier. While the technique is described as advantageous to satellite repeater based communication systems, it may also be useful in other systems where non-coherent or non-pilot signal type communication occurs.

The previous description of the preferred embodiments is provided to enable any person skilled in the art to make or use the present invention.

The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What we claim is:

1. A method for tracking the frequency and phase of carrier signals in a spread spectrum communication system in which information is communicated over signals that are bandwidth spread and encoded into channels using orthogonal codes, comprising the steps of:

receiving a plurality of spread spectrum communication signals having a common carrier frequency and converting said signals to digital form;

despreading said digital spread spectrum communication signals by applying at least one preselected despreading code at an adjustable phase angle; decoding multiple ones of said despread communication signals in parallel to remove said orthogonal encoding, over multiple orthogonal codes active within said communication system, to generate multiple data symbol signals; summing a plurality of said multiple data symbol signals to form a single phase detection signal; inputting said phase detection signal to at least one timing loop to track the frequency thereof and outputting a timing signal indicative of carrier signal frequency; and adjusting said phase angle in said despreading in response to said timing signal from said timing loop.

2. The method of claim 1 wherein said received communication signals are transferred through a gateway type base station and at least one satellite based repeater and then received by a remote subscriber unit within said communication system.

3. The method of claim I wherein said spread spectrum communication system uses pseudorandom noise (PN) encoded spread spectrum type signals.

4. A method for tracking the frequency and phase of carrier signals in a spread spectrum communication system in which information is communicated over signals that are bandwidth spread and encoded into channels using orthogonal codes, comprising the steps of:

receiving a plurality of orthogonally channelized spread spectrum communication signals contemporaneously having a common carrier frequency and converting said signals to digital form;

despreading received orthogonally Channelized communication signals using a preselected adjustable phase angle for applying despreading codes, and splitting said signals into first and second components producing first and second streams of code symbols;

transferring said first and second streams of code symbols to first and second orthogonal function transformers, respectively, and generating first and second sets of signal bits;

generating a phase correction signal from said first and second sets of signal bits by forming products between corresponding pairs, each pair comprising one bit each from said first and second sets, of said signal bits and summing said products over multiple orthogonal codes active within said communication system; and adjusting said preselected phase angle in response to a value of said phase correction signal.

5. The phase tracking method of claim 4 wherein preselected in-phase and quadrature (Q)PN sequences are used to modulate in-phase (I) and quadrature components of said communication signals prior to transmission to intended recipients, and said despreading and splitting step comprises the steps of:

phase rotating said received signals using said I and Q PN sequences to adjust said adjustable phase angle; and directing said rotated signals into both first and second signal channels.

6. The phase tracking method of claim 4 wherein said step of transferring first and second streams of code symbols and generating first and second sets of signal bits, comprises the step of applying said symbols to first and second Fast Hadamard Transformers, respectively, so as to transform code symbols to data bits.

7. The method of claim 4 wherein said received communication signals are transferred through a gateway type base station and at least one satellite based repeater and then received by a remote subscriber unit within said communication system.

8. The method of claim 4 further comprising the steps of:

despreading and splitting said digital form signals into I and Q components using phase rotation at a second preselected adjustable phase angle, producing second I and Q component symbols;

transferring said second I and Q component symbols to third and fourth orthogonal function transformers, respectively, and generating a set of I and Q signal bits;

accumulating said set of I and Q signal bits in separate predefined groupings and producing a square product of each group;

generating a difference between corresponding I and Q grouped products;

summing resulting differences over multiple orthogonal codes active within said communication system; and filtering said summation result to form a timing control signal.

9. The method of claim 8 further comprising the steps of:

decimating digital signals prior to said despreading; and adjusting a timing point for said decimation in response to changes in value for said timing control signal.

10. The method of claim 4 wherein said orthogonal codes are Walsh functions.

11. The method of claim 4 further comprising the step of outputting said I signal bits, as representative of data intended for multiple active users using said common carrier being tracked, to a coherent signal decoding circuit.

12. Apparatus for tracking the frequency and phase of carrier signals in a spread spectrum communication system in which information is communicated over signals that are bandwidth spread and encoded into channels using orthogonal codes, comprising:

means for receiving and converting a plurality of spread spectrum communication signals having a common carrier frequency to digital form;

means for despreading connected to an output of said means for receiving and converting, for despreading said digital spread spectrum communication signals by applying at least one preselected despreading code at an adjustable phase angle;

means for decoding connected to receive multiple ones of said despread communication signals in parallel for removing said orthogonal encoding, over multiple orthogonal codes active within said communication system, to generate multiple data symbol signals;

means for summing connected to receive a plurality of said multiple data symbol signals for forming a single phase detection signal;

at least one timing loop connected to receive said phase detection signal to track the frequency thereof and output a timing signal indicative of carrier signal frequency; and means for adjusting said phase angle of said despreading means in response to said timing signal from said timing loop.

13. The method of claim 12 wherein said received communication signals are transferred through a gateway type base station and at least one satellite based repeater and then received by a remote subscriber unit within said communication system.

14. Apparatus for tracking the phase of carrier signals in a spread spectrum communication system in which information is communicated over signals that are bandwidth spread and encoded into channels using orthogonal codes and transmitted to at least one recipient at a time, comprising:

means for receiving a plurality of spread spectrum communication signals having a common carrier frequency and converting said signals to digital form;

means for despreading using an adjustable phase angle for applying despreading codes to produce code symbols, connected to receive said digital form signals, and for splitting said signals into first and second components;

means for performing orthogonal function transformations on said first and second components of code symbols to produce first and second sets of signal bits, respectively, connected to outputs for said despreading and splitting means;

means for generating a phase correction signal from said first and second sets of signal bits connected in series with said transformation means, said generating occurring in part by forming products between corresponding pairs of said signal bits, and summing said products over multiple orthogonal codes active within said communication system; and means for adjusting said preselected phase angle in response to a value of said phase correction signal.

15. The apparatus of claim 14, wherein said means for performing orthogonal function transformations comprises first and second Fast Hadamard Transformers of order N, where N equals the number of desired system channels including the number of pilot signal, paging, and synchronization signal channels, connected to receive said first and second signal components, respectively, so as to receive data symbols and provide corresponding data bits as outputs.

16. The apparatus of claim 14, wherein said orthogonal coding uses Walsh functions and said phase correction signal means is configured to sum over all active Walsh functions corresponding to signals using said common carrier frequency in said communication system.

17. The apparatus of claim 14 further comprising:

second means for despreading and splitting said digital form signals into I and Q components using phase rotation at a second preselected adjustable phase angle, for producing streams of I and Q component symbols;

means for transferring said streams of I and Q component symbols to third and fourth orthogonal function transformers, respectively, and generating sets of I and Q signal bits;

second means for accumulating said I and Q signal bits in separate predefined groupings and producing a square product of each group;

means for generating a difference between corresponding I and Q grouped bit products;

means for summing resulting differences over multiple orthogonal codes active within said communication system; and means for filtering said summation result to form a timing control signal.

18. The apparatus of claim 17 further comprising:
means for decimating digital signals prior to input to said first despreading means; and
means for adjusting offset timing for said decimation in response to changes in value for said timing control signal.

19. The system of claim 14 wherein said communication system comprises a wireless telephone/data communication system in which remote users are located within a plurality of cells and communicate information signals to at least one gateway, using code division multiple access (CDMA) spread spectrum type communication signals.

20. The apparatus of claim 14 further comprising:
means for disengaging input from one channel for said first and second components for said means for generating a phase correction signal so as to allow accumulation of single channel data; and
means for detecting a relative signal strength for signal carriers from said single channel data.

21. Apparatus for tracking the phase of carrier signals in a spread spectrum communication system in which information is communicated over signals that are bandwidth spread and encoded into channels using orthogonal codes transmitted to at least one recipient at a time, comprising:
at least one analog receiver configured to receive a plurality of spread spectrum communication signals having a common carrier frequency and convert said signals to digital form;
a digital signal despreader and splitter connected to receive said digital form signals and produce I and Q streams of component symbols by applying despreading codes at a preselected adjustable phase angle;
orthogonal function transformers connected one each in series with said I and Q outputs for said despreader and splitter, which operates on said streams of I and Q component symbols to produce sets of I and Q signal bits, respectively;
a phase correction signal generator connected in series with said transformers to receive said I and Q signal bits, and configured to form products between corresponding pairs of said I and Q signal bits, and sum said products over multiple orthogonal codes active within said communication system to form a phase correction signal; and
a phase angle adjuster connected to said digital signal despreader and splitter and said phase correction signal generator, which alters said preselected phase angle in response to a value of said phase error correction signal.

22. The apparatus of claim 21 wherein said phase correction signal generator comprises:
at least one accumulation element connected in series with each of said transformers to receive said I or Q signal bits;
a multiplier connected to outputs of said accumulators to form products between corresponding pairs of said I and Q signal bits; and
an adder accumulator that sums said products over multiple orthogonal codes active within said communication system.

23. The apparatus of claim 21 wherein said despreader and splitter comprises a four phase rotator having multiple phase adjustment inputs.

24. The apparatus of claim 21 wherein said orthogonal function transformers comprise fast Hadamard transformation devices.

25. A spread spectrum communication system in which a plurality of data signals to be transmitted are spread according to a predetermined spreading code, comprising:
a plurality of gateway type base stations each including at least one communication signal transmitter, comprising:
a plurality of signal generating means for generating a plurality of function signals each according to a respective function of a plurality of orthogonal functions;
a plurality of spreading means each connected to a respective signal generator means for receiving a respective data signal of the plurality of data signals and for producing a respective spread spectrum data signal in response to a respective function signal;
combining means connected to the plurality of spreading means for providing a spread spectrum communication signal combining a plurality of spread spectrum data signals; and
transmission means connected to the combining means for amplifying and transmitting the spread spectrum communication signal;
a plurality of user terminals each including a user receiver, comprising:
means for selecting and receiving a spread spectrum communication signal from at least one gateway having a common carrier frequency and converting said signal to digital form;
means for despreading said digital form signals using an adjustable phase angle for applying despreading codes to produce code symbols, connected to said means for selecting and receiving,
means for decoding multiple ones of said despread communication signals in parallel to remove said orthogonal encoding, over multiple orthogonal codes active within said communication system, to generate multiple data symbol signals;
means for summing a plurality of said multiple data symbol signals to form a single phase detection signal;
means for inputting said phase detection signal to at least one timing loop to track the frequency thereof and for outputting a timing signal indicative of carrier signal frequency; and
means for adjusting said phase angle used in said despreading in response to said timing signal from said timing loop.

26. A method for spread spectrum-communication between a plurality of gateway type base stations and a plurality of user terminals, comprising the steps of:
generating a plurality of function signals at each gateway each according to a respective function of a plurality of orthogonal functions;
generating a plurality of spread spectrum data signals by combining a respective function signal with one of at least one data signal;
producing a spread spectrum communication signal by summing the plurality of spread spectrum data signals together, and amplifying and transmitting the spread spectrum communication signal;
selecting and receiving spread spectrum communication signals from at least one gateway having a common carrier frequency at one or more user terminals and converting said signals to digital form;
despreading said digital form signals using an adjustable phase angle for applying despreading codes to produce multiple code symbol signals;

performing orthogonal function transformations on a plurality of said multiple code symbol signals in parallel to remove orthogonal encoding, over multiple orthogonal codes active within said plurality of user terminals, and produce multiple data symbol signals;

generating a phase correction signal from said data symbol signals by summing a plurality of said multiple data symbol signals;

inputting said phase correction signal to at least one timing loop to track the frequency thereof, and generating a timing signal indicative of carrier signal frequency; and adjusting said phase angle in said despreading in response to said timing signal from said timing loop.

* * * * *